(12) United States Patent
Moody et al.

(10) Patent No.: US 10,101,754 B2
(45) Date of Patent: Oct. 16, 2018

(54) FLOW CONTROL SYSTEM

(71) Applicants: Jonathan Moody, Hudson, FL (US); Raymond Bellas, New Port Richey, FL (US)

(72) Inventors: Jonathan Moody, Hudson, FL (US); Raymond Bellas, New Port Richey, FL (US)

( * ) Notice: Subject to any disclaimer, the term of this patent is extended or adjusted under 35 U.S.C. 154(b) by 99 days.

(21) Appl. No.: 15/148,828

(22) Filed: May 6, 2016

(65) Prior Publication Data

US 2017/0322569 A1    Nov. 9, 2017

(51) Int. Cl.
*F17D 1/00* (2006.01)
*G05D 9/02* (2006.01)
*E02B 8/00* (2006.01)

(52) U.S. Cl.
CPC ................... *G05D 9/02* (2013.01); *E02B 8/00* (2013.01)

(58) Field of Classification Search
CPC .......... G05D 7/0166; G05D 9/02; E03F 5/107
USPC ..... 137/577, 578; 405/40, 41, 80, 92, 96, 67
See application file for complete search history.

(56) References Cited

U.S. PATENT DOCUMENTS

| | | | | |
|---|---|---|---|---|
| 706,526 | A * | 8/1902 | Carlisle | E02B 5/08 137/578 |
| 2,882,928 | A * | 4/1959 | Cogliati | G05D 7/0166 137/578 |
| 6,132,139 | A * | 10/2000 | Hashimoto | A01G 22/22 405/104 |
| 8,043,026 | B2 * | 10/2011 | Moody | E03F 5/107 137/578 |
| 9,051,702 | B2 * | 6/2015 | Moody | E02B 8/045 |
| 9,476,185 | B2 * | 10/2016 | Clark | E03B 3/04 |
| 2005/0025573 | A1 * | 2/2005 | Waldman | E02B 13/02 405/41 |
| 2005/0036840 | A1 * | 2/2005 | Fleeger | E03F 5/101 405/96 |

* cited by examiner

*Primary Examiner* — Reinaldo Sanchez-Medina
(74) *Attorney, Agent, or Firm* — Justin Luby

(57) ABSTRACT

An application for a flow control system includes a pressure vessel, positioned within the interior of a container which is fluidly interfaced to a downstream drainage system. The pressure vessel has at least one opening through its lower surface, through which it is slideably engaged over the exterior of a closed conduit which is in fluid communication with an upstream reservoir. There is no need for a seal between the pressure vessel and the closed conduit such that the interior of the pressure vessel is in fluid communication with the interior of the container. Additional openings, from the interior of the pressure vessel may also be provided. A means to restrain the pressure vessel from significant lateral movement is provided. As the fluid pressure rises in the pressure vessel in response to an increase in the fluid level in the upstream reservoir, the openings through the pressure vessel rise to prescribed level and the release rate of fluid into the downstream drainage system is maintained at a prescribed rate or range of rates as the fluid level continues to rise.

26 Claims, 12 Drawing Sheets

FLOW CONTROL SYSTEM

CROSS-REFERENCE TO RELATED APPLICATIONS

Not Applicable

FIELD OF THE INVENTION

The disclosure relates to the field of flow control systems and more particularly to a flow control system for detention ponds, surge tanks, reservoirs and other applications wherein upstream fluid levels vary in response to varying rates of inflow.

BACKGROUND

There are many fluid handling systems wherein the upstream fluid levels or pressures vary and it is desirable to passively control the rate of release with a flow control system which requires no human intervention or external energy source to activate. Examples of these systems include storm water detention ponds, storage reservoirs, holding tanks, surge tanks and the like. In general, these systems receive varying rates of fluid flow, which at times may exceed the desirable release rate or range of release rates as the case may be. When the inflow rate to these systems exceeds the release rate, a volume of fluid is stored and in response, the upstream fluid level rises. Conversely, when the release rate exceeds the inflow rate, the stored volume of fluid is released and the upstream fluid level falls.

Historically, the release rate from these type systems have been passively controlled with weirs and orifices, both of which produce flow rates which increase exponentially as the upstream fluid level rises. When inflow rates dramatically exceed the desirable outflow rate, this characteristic often results in a system wherein a large volume of storage is required to control the fluid at or below the level which does not produce a release in excess of the desired rate or range of rates. Since the costs of land acquisition, engineering, construction and transportation associated with creating large volumes of storage can be quite expensive, it is advantageous to design these systems with as little volume as possible. This objective is accomplished when the system design accommodates release at the desired rate for the maximum amount of time, as is depicted in FIG. 3 of U.S. Pat. No. 7,052,206 to Mastromonaco.

The prior art is replete with a variety of possible solutions to this design problem. One such example is disclosed in U.S. Pat. No. 7,125,200 to Fulton wherein he describes a flow control system for a holding pond consisting of a buoyant flow control module housing an orifice within an interior chamber that is maintained at a predetermined depth below the water surface. Fluid discharged through the orifice is conveyed to the outlet through a bellow, an accordion like conduit which facilitates vertical motion of the buoyant flow control module. Another such example is disclosed in U.S. Pat. No. 6,997,644 to Fleeger, wherein he describes a floating weir assembly for incorporation into a detention vessel. The floating weir assembly is supported by a buoyant means which maintains the weir opening at a predetermined depth below the water surface. In order to facilitate vertical motion, fluid passing over the weir is conveyed to the outlet by means of a hose which has greater capacity than the discharge produced by the weir. In U.S. Pat. No. 6,474,361 to Poppe a floating weir assembly is described which is ballasted with a flowable medium such as liquid or a solid particulate matter like sand to maintain the submergence of the assembly at predetermined depth below the fluid surface. Similar to Fleeger's disclosure, the preferred means to convey discharge to the outlet is a flexible hose. In U.S. Pat. No. 7,762,741 to Moody, co-inventor of the present disclosure, a flow control system for incorporation into a detention pond or surge tank is described whereby a moving riser, made buoyant and supported by at least one float is suspended within a stationary riser such that the opening to the moving riser is maintained at a fixed and predetermined depth below the fluid surface. Discharge through and around the moving riser is conveyed to the outlet through the stationary riser. Each of the foregoing examples utilize buoyancy to maintain the opening of a fluid passage at a fixed and predetermined depth below the upstream fluid surface.

Other proposed solutions have used buoyancy to effect changes in the area of a fluid passage. One such example is disclosed in U.S. Pat. No. 8,043,026 to Moody, co-inventor of the present disclosure, wherein a flow control system for incorporation into a detention pond or surge tank is described. The flow control system comprises a tapered plunger, suspended from at least one float, and the tapered plunger is located within and at the bottom edge of a vertically oriented tube which is fixed in a stationary position. Fluid from the upstream reservoir enters the tube from the upper end and its flow is restricted at the bottom end. As the upstream fluid level changes, the float moves the tapered plunger such that the area of the fluid passage between the inside, bottom edge of the stationary tube and the outside edge of the tapered plunger is reduced when the fluid level rises and conversely, increases as the fluid level falls. In the preferred embodiment, the taper of the plunger is formed such that the change in the area of the fluid passage maintains the flow rate at a constant rate.

Other solutions have sought to change the area of the fluid passage by the use of pressure rather than buoyancy. In U.S. Pat. No. 5,887,613 to Steinhardt a flow control system is disclosed whereby fluid pressure acts against a "form-changeable member" with a hollow interior which is connected to a pressure different from the pressure outside of the "form-changeable member". The "form-changeable member" is biased with a spring against a bracket which supports a gate over the fluid passage. As the fluid level in the upstream reservoir rises, the pressure acting on the "form-changeable member" in turn rises, acting against the spring and reducing the area of the fluid passage. In the preferred embodiment, the bias of the spring and the geometry of the gate are designed such that the flow rate through the fluid passage remains constant as the upstream fluid levels both rise and fall.

Although all of these disclosures are passively operated and can theoretically control the rate of fluid release at a constant or nearly constant rate, they all rely on floats, springs and/or flexible conduits operating in conditions wherein the pressure on the outside of the conduit is higher than the pressure inside the conduit. These features have proven to be problematic for a number of reasons. Floats which are hollow can rupture and floats which are solid can absorb water over time which increases their density and reduces their net buoyancy. Springs may suffer from decreasing bias over time due to strain and repeated cyclical motion. Metallic springs can often corrode due to a variety of elemental exposures. Flexible conduits such as bellows and hoses, operating in conditions where the pressure outside of the conduit is greater than the pressure inside of the conduit, may collapse from the effects of excess hydrostatic pressure, often at depths much less than the design depth of the storage reservoir in which they are immersed.

Accordingly there is a need for a flow control system that does not rely on floats, biasing members such as springs, or flexible conduits which are immersed in the fluid reservoir from which the flow control system is intended to control the release.

SUMMARY

The flow control system of the present invention includes a pressure vessel, an axis of which is vertical, having a hollow interior, enclosed by an upper surface, a lower surface and a vertical surface, which joins the lower surface to the upper surface. An opening is provided through the lower surface of the pressure vessel, and the lower surface of the pressure vessel is slideably engaged, over the exterior of the downstream, outlet end of a closed conduit. The closed conduit is fluidly interfaced to an upstream reservoir, and has an axis which is vertical at its downstream end.

The pressure vessel and the downstream, outlet end of the closed conduit are positioned within the interior of a container, which is fluidly interfaced to a downstream drainage system, and wherein the ambient, atmospheric pressure is maintained. Whereas there is no need for a seal between the lower surface of the pressure vessel and the exterior of the closed conduit, the interior of the pressure vessel is in fluid communication with the interior of the container, such that fluid can pass from the interior of the pressure vessel, into the interior of the container, through the interstitial opening, formed by the intersection of the exterior of the closed conduit with the opening through the lower surface of the pressure vessel. In some embodiments, additional openings provided through the upper, lower or vertical surfaces of the pressure vessel. A means to restrain the pressure vessel from significant lateral movement, yet which allows the pressure vessel to move vertically, is also provided.

When the fluid level in the upstream reservoir is at its initial, minimum, controlled level, it is at the same level as the lowest point of the downstream, outlet end of the closed conduit which opens into the interior of the pressure vessel, and there is no discharge of fluid through the flow control system. As the upstream reservoir receives inflow, and the fluid level rises above the initial, minimum, controlled level, the fluid flows from the reservoir, upward through the closed conduit, into the pressure vessel, out through the interstitial space formed by the intersection of the exterior of the closed conduit, with the opening through the lower surface of the pressure vessel, into the interior of the container, and out into the downstream drainage system. As the fluid level in the upstream reservoir continues to rise, the rate of fluid flow, into the interior of the pressure vessel, increases to a rate which is greater than fluid can flow out through any of the openings from the interior of the pressure vessel, and the pressure vessel fills completely with fluid. Further, as the fluid level in the upstream reservoir continues to rise, the fluid pressure in the interior of the pressure vessel rises, and exerts a net upward force, on the upper, interior surface of the pressure vessel, thereby moving the pressure vessel, and any openings from the interior of the pressure vessel, upward, to a prescribed level, which is below the fluid level in the upstream reservoir, and the rate of flow through the flow control system is maintained at the desirable release rate, or range of release rates, prescribed for the fluid handling system.

In the preferred embodiment, a flow control system for integration into a fluid handling system, wherein the upstream fluid level varies, is disclosed including a pressure vessel, an axis of which is vertical, having a hollow interior, which is enclosed by an upper surface, a lower surface, and vertical surface, which joins the lower surface to the upper surface. An opening is provided through the lower surface of the pressure vessel, and the lower surface of the pressure vessel is slideably engaged, over the exterior of the downstream, outlet end of a closed conduit. The closed conduit is fluidly interfaced to an upstream reservoir, and has an axis which is vertical at its downstream end. The pressure vessel and the downstream, outlet end of the closed conduit are positioned within the interior of a container, which is fluidly interfaced to a downstream drainage system, and wherein the ambient, atmospheric pressure is maintained. Whereas there is no seal between the lower surface of the pressure vessel and the exterior of the closed conduit, the interior of the pressure vessel is in fluid communication with the interior of the container, such that fluid can pass from the interior of the pressure vessel, into the interior of the container, through the interstitial opening formed by the intersection of the exterior of the closed conduit, with the opening through the lower surface of the pressure vessel. At least one guide bushing is affixed to the exterior, vertical surface of the pressure vessel, and is slideably engaged over the exterior of at least one guide rod, the axis of which is vertical, and which is affixed within the interior of the container. The guide bushing and guide rod restrains the pressure vessel from significant lateral movement, yet allows the pressure vessel to move vertically.

When the fluid level in the upstream reservoir is at its initial, minimum, controlled level, it is at the same level as the lowest point of downstream, outlet end of the closed conduit, and there is no discharge of fluid through the flow control system. As the upstream reservoir receives inflow and the fluid level rises above the initial, minimum, controlled level, the fluid flows from the reservoir, upward through the closed conduit, into the pressure vessel, out through the interstitial space formed by the intersection of the exterior of the closed conduit, with the opening through the lower surface of the pressure vessel, into the interior of the container, and out into the downstream drainage system. As the fluid level in the upstream reservoir continues to rise, the rate of fluid flow into the interior of the pressure vessel increases to a rate which is greater than fluid can flow out of the interior of the pressure vessel, and the pressure vessel fills completely with fluid. As the fluid level in the upstream reservoir rises further, the fluid pressure in the interior of the pressure vessel rises, and exerts a net upward force on the upper, interior surface of the pressure vessel, thereby moving the pressure vessel, and the opening from the interior of the pressure vessel at its lower end, upward, to a prescribed level which is below the fluid level in the upstream reservoir, and the rate of flow through the flow control system is maintained within the desirable range of release rates prescribed for the fluid handling system.

In a first alternate embodiment, a flow control system for integration into a fluid handling system, wherein the upstream fluid level varies, is disclosed including a pressure vessel, an axis of which is vertical, having a hollow interior, which is enclosed by an upper surface, a lower surface, and vertical surface which joins the lower surface to the upper surface. An opening is provided through both the upper and lower surfaces of the pressure vessel. The lower surface of the pressure vessel is slideably engaged over the exterior of the downstream, outlet end of a closed conduit, which is fluidly interfaced to an upstream reservoir, and has an axis which is vertical at its downstream end. The pressure vessel and the downstream, outlet end of the closed conduit are positioned within the interior of a container, which is fluidly interfaced to a downstream drainage system, and wherein the ambient, atmospheric pressure is maintained. A standpipe, an axis of which is vertical, is also positioned and affixed within the interior of the container. The standpipe is positioned such that it is aligned with the upper surface of the pressure vessel, and the upper surface of the pressure vessel is slideably engaged over the exterior of the distal, lower end of the standpipe, such that the pressure vessel is free to move vertically, over the exterior of the closed conduit and standpipe, yet is restrained from any significant lateral movement. Whereas there is no seal between the lower surface of the pressure vessel and the exterior of the closed conduit, and there is no seal between the upper surface of the pressure vessel and the exterior of the standpipe (however, optionally one could be utilized), the interior of the pressure vessel is in fluid communication with the interior of the container, such that fluid can pass from the interior of the pressure vessel, into the interior of the container, through the interstitial openings formed by the intersection of the upper and lower surfaces of the pressure vessel with the exterior surfaces of the standpipe and closed conduit, respectively.

When the fluid level in the upstream reservoir is at its initial, minimum, controlled level, it is at the same level as the lowest point of the downstream, outlet end of the closed conduit and there is no discharge of fluid through the flow control system. As the upstream reservoir receives inflow and the fluid level rises above the initial, minimum, controlled level, the fluid flows from the reservoir, upward through the closed conduit, into the pressure vessel, out through the interstitial opening at the lower end of the pressure vessel, into the interior of the container, and out into the downstream drainage system. As the fluid level in the upstream reservoir continues to rise, the rate of fluid flow into the interior of the pressure vessel becomes greater than the rate at which fluid can flow out through the interstitial opening at the lower end of the pressure vessel and the pressure vessel fills completely with fluid. Whereas when the pressure vessel is completely full of fluid, and the fluid level in the upstream reservoir rises above the level of the interstitial opening through the upper end of the pressure vessel, fluid also flows out through the interstitial opening at the upper end of the pressure vessel, into the interior of the container, and out into the downstream drainage system. As the fluid level in the upstream reservoir rises further, the fluid pressure within the interior of the pressure vessel rises, and exerts a net, upward force on the upper, interior surface of the pressure vessel, thereby moving the pressure vessel, and the interstitial openings at each end of the pressure vessel, upward, to a prescribed level which is below the fluid level in the upstream reservoir, and the rate of flow through the flow control system is maintained within the desirable range of release rates prescribed for the fluid handling system.

When the cross sectional area of the walls of the standpipe and the closed conduit are identical, the volume of fluid contained within the interior of the pressure vessel, and the portion of the closed conduit within the interior of the pressure vessel, is maintained constant as it rises, and the rate of flow through the flow control system is also maintained constant.

In a second alternate embodiment, a flow control system for integration into a fluid handling system, wherein the upstream fluid level varies, is disclosed including a pressure vessel, an axis of which is vertical, having a hollow interior, which is enclosed by an upper surface, a lower surface, and a vertical surface which joins the lower surface to the upper surface. An opening is provided through both the upper and lower surfaces of the pressure vessel. The lower surface of the pressure vessel is slideably engaged over the exterior of the downstream, outlet end of a closed conduit, which is fluidly interfaced to an upstream reservoir, and has an axis which is vertical at its downstream, outlet end. The pressure vessel and the downstream, outlet end of the closed conduit are positioned within the interior of a container, which is fluidly interfaced to a downstream drainage system, and wherein the ambient, atmospheric pressure is maintained. At least one rigid rod, an axis of which is vertical, is also positioned and affixed within the interior of the container. The rigid rod is positioned such that it is aligned with the upper surface of the pressure vessel, and the upper surface of the pressure vessel is slideably engaged over the exterior of the distal, lower end of the rigid rod, such that the pressure vessel is free to move vertically over the exterior of the closed conduit and the rigid rod, yet is restrained from any significant lateral movement. Whereas there is no seal between the lower surface of the pressure vessel and the exterior of the closed conduit, and there is no seal between the upper surface of the pressure vessel and the exterior of the rigid rod (however, optionally one could be utilized), the interior of the pressure vessel is in fluid communication with the interior of the container, such that fluid can pass from the interior of the pressure vessel, into the interior of the container, through the interstitial openings formed by the intersection of the upper and lower surfaces of the pressure vessel, with the exterior surfaces of the rigid rod and closed conduit, respectively.

When the fluid level in the upstream reservoir is at its initial, minimum, controlled level, it is at the same level as the lowest point of the downstream, outlet end of the closed conduit and there is no discharge of fluid through the flow control system. As the upstream reservoir receives inflow and the fluid level rises above the initial, minimum, controlled level, the fluid flows from the reservoir, upward through the closed conduit, into the pressure vessel, out through the interstitial opening at the lower end of the pressure vessel, into the interior of the container, and out into the downstream drainage system. As the fluid level in the upstream reservoir continues to rise, the rate of fluid flow into the interior of the pressure vessel becomes greater than the rate at which fluid can flow out through the interstitial opening at the lower end of the pressure vessel and the pressure vessel fills completely with fluid. Whereas when the pressure vessel is completely full of fluid, and the fluid level in the upstream reservoir rises above the level of the interstitial opening through the upper surface of the pressure vessel, fluid also flows out through the interstitial opening at the upper end of the pressure vessel, into the interior of the container, and out into the downstream drainage system. As the fluid level in the upstream reservoir rises further, the fluid pressure within the interior of the pressure vessel rises, and exerts a net, upward force on the upper, interior surface of the pressure vessel, thereby moving the pressure vessel and the interstitial openings at each end of the pressure vessel, upward, to a prescribed level which is below the fluid level in the upstream reservoir, and the rate of flow through the flow control system is maintained within the desirable range of release rates prescribed for the fluid handling system.

In a third alternate embodiment, a flow control system for integration into a fluid handling system, wherein the upstream fluid level varies, is disclosed including a pressure vessel, an axis of which is vertical, having a hollow interior, which is enclosed by an upper surface, a lower surface, and a vertical surface which joins the lower surface to the upper surface. At least one opening is provided through the vertical surface of the pressure vessel, at a prescribed level, or levels, as the case may be, and an opening is also provided through both the upper and lower surfaces of the pressure vessel. The lower surface of the pressure vessel is slideably engaged over the exterior of the downstream, outlet end of a closed conduit, which is fluidly interfaced to an upstream reservoir, and has an axis which is vertical at its downstream end. The pressure vessel and the downstream end of the closed conduit are positioned within the interior of a container, which is fluidly interfaced to a downstream drainage system, and wherein the ambient, atmospheric pressure is maintained. At least one rigid rod, an axis of which is vertical, is also positioned and affixed within the interior of the container. The rigid rod is positioned such that it is aligned with the upper surface of the pressure vessel, and the upper surface of the pressure vessel is slideably engaged over the exterior of the distal, lower end of the rigid rod, such that the pressure vessel is free to move vertically over the exterior of the closed conduit and the rigid rod, yet is restrained from any significant lateral movement. Whereas there is no seal between the lower surface of the pressure vessel and the exterior of the closed conduit, and there is no seal between the upper surface of the pressure vessel and the exterior of the rigid rod (however, optionally one could be utilized), the interior of the pressure vessel is in fluid communication with the interior of the container, such that fluid can pass from the interior of the pressure vessel, into the interior of the container, through the interstitial openings formed by the intersection of the upper and lower surfaces of the pressure vessel with the exterior surfaces of the rigid rod and closed conduit, respectively. The interior of the pressure vessel is in further fluid communication with the interior of the container through the opening provided, at a prescribed level, or levels, through the vertical surface of the pressure vessel.

When the fluid level in the upstream reservoir is at its initial, minimum, controlled level, it is at the same level as the lowest point of the downstream, outlet end of the closed conduit and there is no discharge of fluid through the flow control system. As the upstream reservoir receives inflow and the fluid level in the upstream reservoir rises above the initial, minimum, controlled level, the fluid flows from the reservoir, upward through the closed conduit, into the pressure vessel, out through the interstitial opening at the lower end of the pressure vessel, into the interior of the container, and out into the downstream drainage system. As the fluid level in the upstream reservoir continues to rise, the rate of fluid flow into the interior of the pressure vessel becomes greater than the rate at which fluid can flow out through the interstitial opening at the lower end of the pressure vessel and the pressure vessel fills. Whereas when fluid level in the upstream reservoir has risen to a level which is above the interstitial opening provided through the upper surface of the pressure vessel, and the pressure vessel is completely full of fluid, fluid flows out from the interior of the pressure vessel, into the interior of the container, through all of the openings provided through the upper, lower and vertical surfaces of the pressure vessel, and out into the downstream drainage system. As the fluid level in the upstream reservoir rises further, the fluid pressure within the interior of the pressure vessel rises, and exerts a net, upward force on the upper, interior surface of the pressure vessel, thereby moving the pressure vessel and the openings through the upper, lower and vertical surfaces of the pressure vessel, upward, to a prescribed level which is below the fluid level in the upstream reservoir, and the rate of flow through the flow control system is maintained within the desirable range of release rates prescribed for the fluid handling system.

In a fourth alternate embodiment, a flow control system for integration into a fluid handling system, wherein the upstream fluid level varies, is disclosed including a pressure vessel, an axis of which is vertical, having a hollow interior which is enclosed by an upper surface, a lower surface, and vertical surface which joins the lower surface to the upper surface. An opening is provided through both the upper and lower surfaces of the pressure vessel and at least one channel, which protrudes from the interior of the pressure vessel, is made integral to, and spans at least a portion of the length of the vertical surface of the pressure vessel. The upper end of the channel is closed, such that it is made contiguous to the interior of the pressure vessel. The lower end of the channel intersects the lower surface of the pressure vessel, and opens from the interior of the pressure vessel to the exterior of the pressure vessel. The lower surface of the pressure vessel is slideably engaged over the exterior of the downstream, outlet end of a closed conduit, which is fluidly interfaced to an upstream reservoir, and has an axis which is vertical at its downstream end. The pressure vessel and the downstream end of the closed conduit are positioned within the interior of a container, which is fluidly interfaced to a downstream drainage system, and wherein the ambient, atmospheric pressure is maintained. At least one rigid rod, an axis of which is vertical, is also positioned and affixed within the interior of the container. The rigid rod is positioned such that it is aligned with the upper surface of the pressure vessel, and the upper surface of the pressure vessel is slideably engaged over the exterior of the distal, lower end of the rigid rod, such that the pressure vessel is free to move vertically over the exterior of the closed conduit and the rigid rod, yet is restrained from any significant lateral movement. Whereas there is no seal between the lower surface of the pressure vessel and the exterior of the closed conduit, and there is no seal between the upper surface of the pressure vessel and the exterior of the rigid rod (however, optionally one could be utilized), the interior of the pressure vessel is in fluid communication with the interior of the container, such that fluid can pass from the interior of the pressure vessel, into the interior of the container, through the interstitial openings formed by the intersection of the upper and lower surfaces of the pressure vessel with the exterior surfaces of the rigid rod and closed conduit, respectively. The area of the interstitial opening, through the lower surface of the pressure vessel, is made larger at the location where the lower end of the channel, protruding from, and spanning at least a portion of the vertical surface of the pressure vessel, intersects the lower surface of the pressure vessel, and thereby provides further fluid communication between the interior of the pressure vessel and the interior of the container.

When the fluid level in the upstream reservoir is at its initial, minimum, controlled level, it is at the same level as the lowest point of the downstream, outlet end of the closed conduit and there is no discharge of fluid through the flow control system. As the upstream reservoir receives inflow and the fluid level in the upstream reservoir rises above the initial, minimum, controlled level, the fluid flows from the reservoir, upward through the closed conduit, into the pressure vessel, out through the interstitial opening at the lower end of the pressure vessel, and out through the area of the interstitial opening which is made larger, at the location where the lower end of the channel, protruding from, and spanning at least a portion of the vertical surface of the pressure vessel, intersects the lower surface of the pressure vessel, into the interior of the container, and out into the downstream drainage system. As the fluid level in the upstream reservoir continues to rise, the rate of fluid flow into the interior of the pressure vessel becomes greater than the rate at which fluid can flow out through the opening at the lower end of the pressure vessel and the pressure vessel fills. Whereas when fluid level in the upstream reservoir has risen to a level which is above the interstitial opening provided through the upper surface of the pressure vessel, and the pressure vessel is completely full of fluid, fluid flows out from the interior of the pressure vessel, into the interior of the container, through all of the openings provided through the upper and, lower surfaces of the pressure vessel, and out into the downstream drainage system. As the fluid level in the upstream reservoir rises further, the fluid pressure within the interior of the pressure vessel rises, and exerts a net, upward force on the upper, interior surface of the pressure vessel, thereby moving the pressure vessel and the openings through the upper and lower surfaces of the pressure vessel, upward, to a prescribed level which is below the fluid level in the upstream reservoir, and the rate of flow through the flow control system is maintained within the desirable range of release rates prescribed for the fluid handling system.

To the accomplishment of the above and related objects the present invention may embodied in the form illustrated in the accompanying drawings. Attention is called to the fact that the drawings are illustrative. Variations are contemplated as being a part of the present invention, limited only by the scope of the claims.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
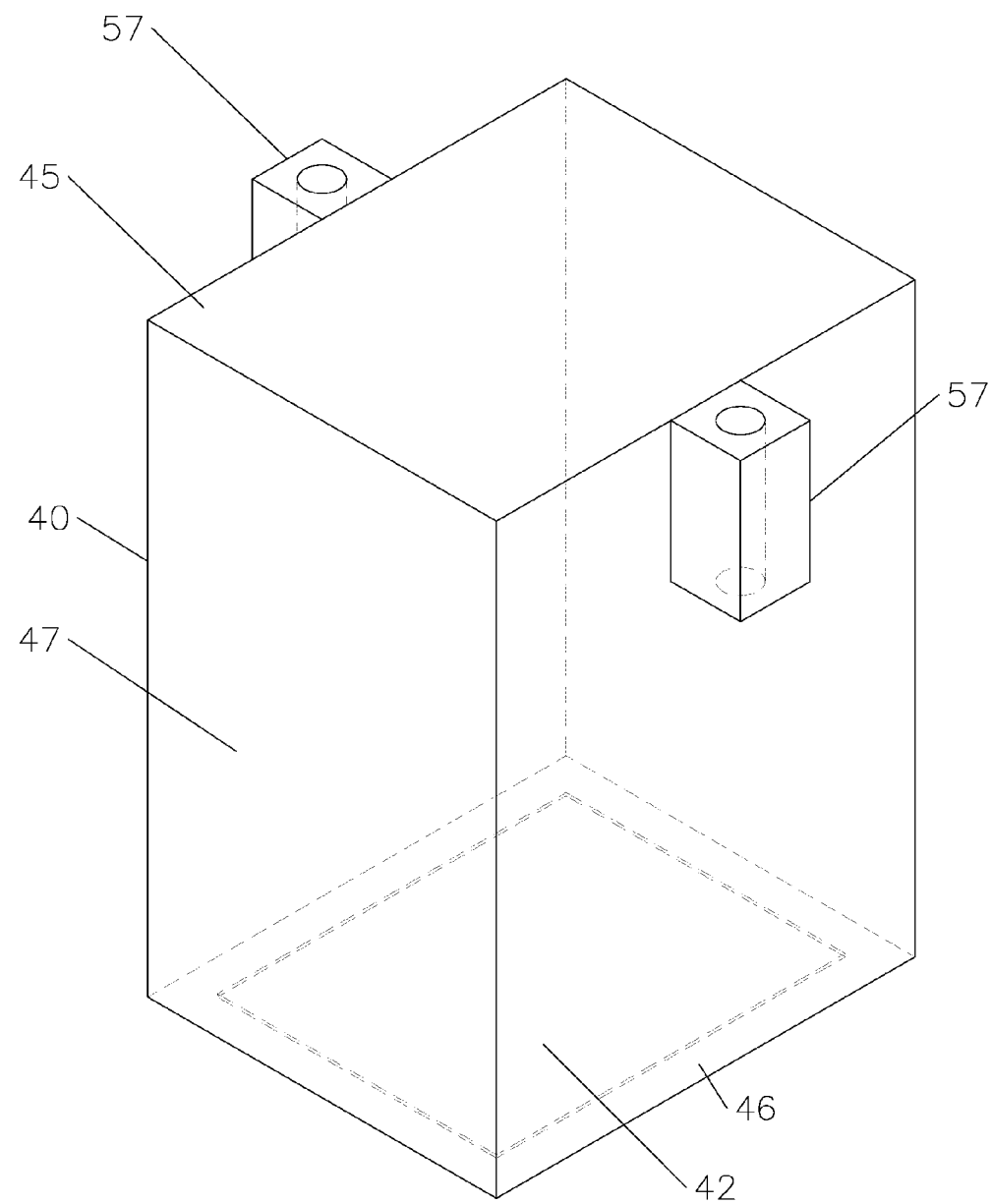
FIG. 1 illustrates a perspective view of the pressure vessel of the present invention.

Reference will now be made in detail to the presently preferred embodiments of the invention, examples of which are illustrated in the accompanying drawings. Throughout the following detailed description, the same reference numerals refer to the same elements in all figures. Throughout the following description, the terms fluid handling system, detention pond, surge tank, holding tank, reservoir, and other applications wherein upstream fluid levels vary, represent any such structure and are equivalent structure for storing a fluid and discharging it at a prescribed, desirable rate or range of rates as the case may be.

The flow control system described provides for an initial discharge rate starting as soon as the upstream reservoir reaches a pre-determined, minimum, controlled fluid level. Then, as the fluid level increases, the discharge rate is controlled at a prescribed rate or range of rates until a high-water level is reached, at which level the flow control system provides for an increased discharge rate to reduce the possibility of exceeding the volumetric capacity of upstream reservoir.

Prior to more advanced flow control systems, limiting the maximum outflow rates was accomplished by the use of fixed weirs and orifices, flow control systems whereby the discharge was controlled in response to the movement of a float, or the bias of a spring, or flow control systems wherein a flexible conduit is immersed in such a manner that the pressure outside of the flexible conduit is greater than the pressure inside of the flexible conduit. Fixed weirs and orifices can only control the discharge rate within a broad range, determined by the range of the fluid level fluctuation in the upstream reservoir. Flow control systems whereby the discharge rate is controlled in response to the movement of floats can be subject to failure if hollow floats are ruptured. Solid displacement float can also suffer a decrease in their net buoyancy, over time, if the floats are formed from materials which have the propensity to absorb fluid. Flow control systems whereby the discharge rate is controlled in response to the bias from a spring can fail, over time, due to decreasing bias caused by strain and repeated cyclical motion, and metallic springs are vulnerable to the effects of corrosion from a variety of elemental exposures. Flow control systems wherein a flexible conduit is immersed in fluid, such that the pressure outside of the flexible conduit is greater than the pressure inside of the flexible conduit, are known to have a very limited range of depth at which they may operate without subjecting the flexible conduit to pressures at which the flexible conduit will collapse. The present invention solves these and other problems as is evident in the following description.

Referring to FIG. 1, a perspective view of the pressure vessel 40 of a first embodiment of the present invention will be described. The pressure vessel 40 has a hollow interior enclosed by an upper surface 45, a lower surface 46 and a vertical surface 47. An opening 42 is provided through the lower surface 46 of the pressure vessel 40. The pressure vessel is made from metal, plastic, fiberglass or any other sufficiently rigid and impervious material suitable for containing a liquid. Two guide bushings 57 are affixed to the exterior of the vertical surface 47 of the pressure vessel 40. The guide bushings 57 may be formed from the same material as the pressure vessel 40; however, it is not required, so long as the material selected has sufficient strength and rigidity to withstand the stresses to which it will be exposed. The guide bushings 57 may be affixed to the vertical surface 47 of the pressure vessel 40 by any number of means including fasteners like screws, or bolts with nuts; or the guide bushings 57 may be affixed by welding or with the use of adhesives. If the pressure vessel 40 is molded, the guide bushings 57 may be made integral to the pressure vessel 40 as part of the casting process. Although the pressure vessel 40 is depicted as having a cubic form, the pressure vessel 40 may be fashioned in any number of geometric forms such as cylindrical, spherical, hemispherical or polyhedral.

Figure 1A:
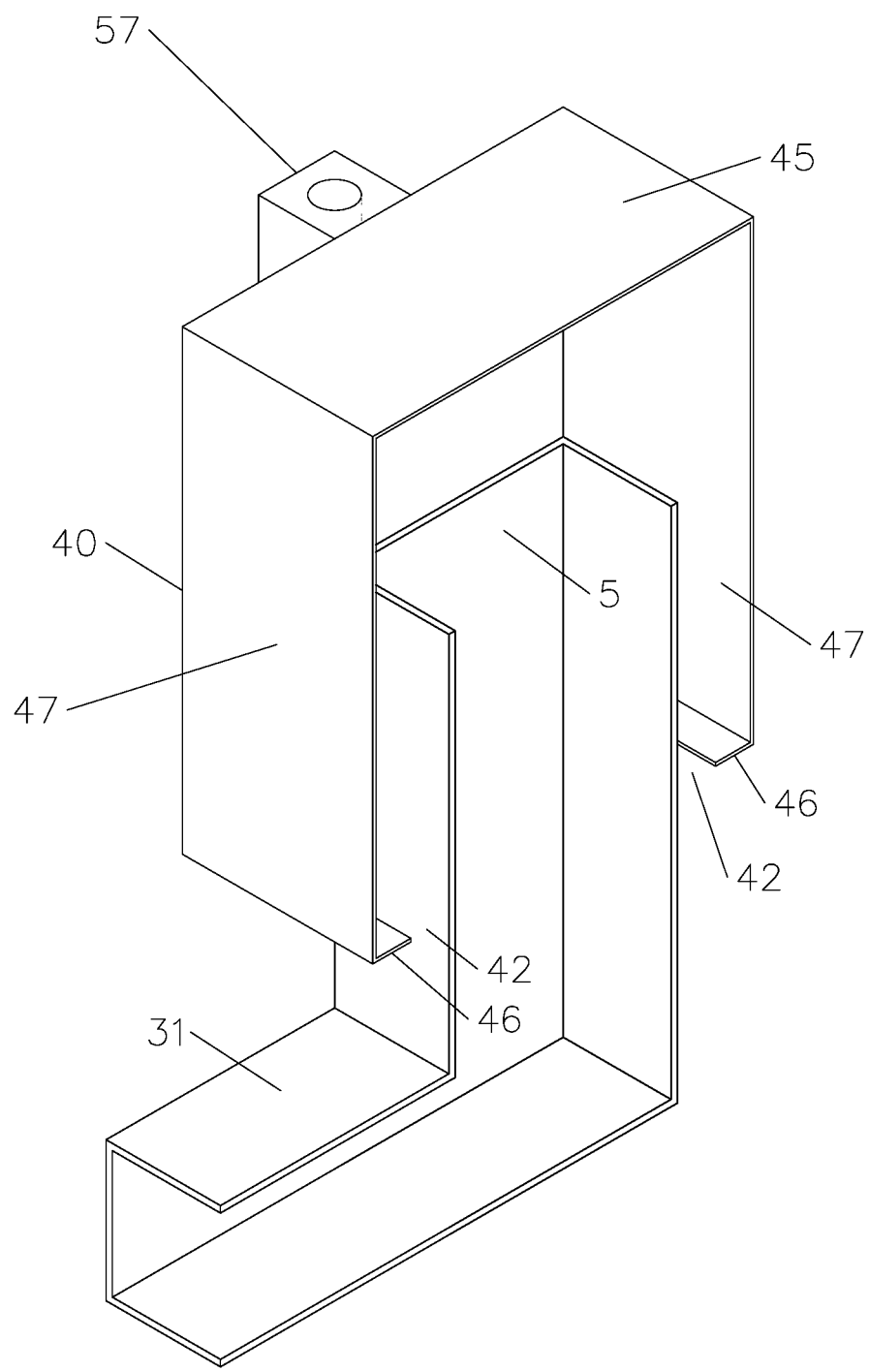
FIG. 1A illustrates a perspective, cross sectional view of the pressure vessel and closed conduit of the present invention.

Referring to FIG. 1A, a perspective, cross sectional view of the pressure vessel 40 and the closed conduit 31 of a first embodiment of the present invention will be described. The closed conduit 31 has an axis which is vertical at its downstream, outlet 5 end. Although a portion of the closed conduit 31 is depicted as having an axis which is horizontal, the same portion of the closed conduit 31 may have an axis at any angle, whereas it is only necessary that the downstream, outlet 5 end of the closed conduit 31 have an axis which is vertical. The closed conduit 31 may be fashioned from any number of materials such as plastic, concrete or metal so long as the material has suitable properties for conveying liquids at the anticipated pressures. The pressure vessel 40 is slideably engaged over the exterior of the downstream, outlet 5 end of the closed conduit 31, through the opening 42, provided through the lower surface 46 of the pressure vessel 40, such that the downstream, outlet 5 end of the closed conduit 31 is enclosed by the upper surface 45, lower surface 46, and vertical surface 47 of the pressure vessel 40. There is no seal between the exterior of closed conduit 31 and the lower surface 46 of the pressure vessel 40, such that when there is liquid in the interior of the pressure vessel 40, it can flow out through the interstitial space, formed by the intersection of the exterior of the closed conduit 31 with the opening 42 through the lower surface 46 of the pressure vessel 40. Although the interstitial space formed by the intersection of the exterior of the closed conduit 31, with the opening 42 through the lower surface 46 of the pressure vessel 40, is depicted as having a uniform and constant dimension; such a uniform and constant dimension is not required, whereas it is anticipated in some embodiments, the dimension may be prescriptively varied with the shape of the opening 42 provided through the lower surface 46 of the pressure vessel 40, the geometric cross section of the portion of the closed conduit 31 over which the pressure vessel 40 is slideably engaged, or both.

Figure 2:
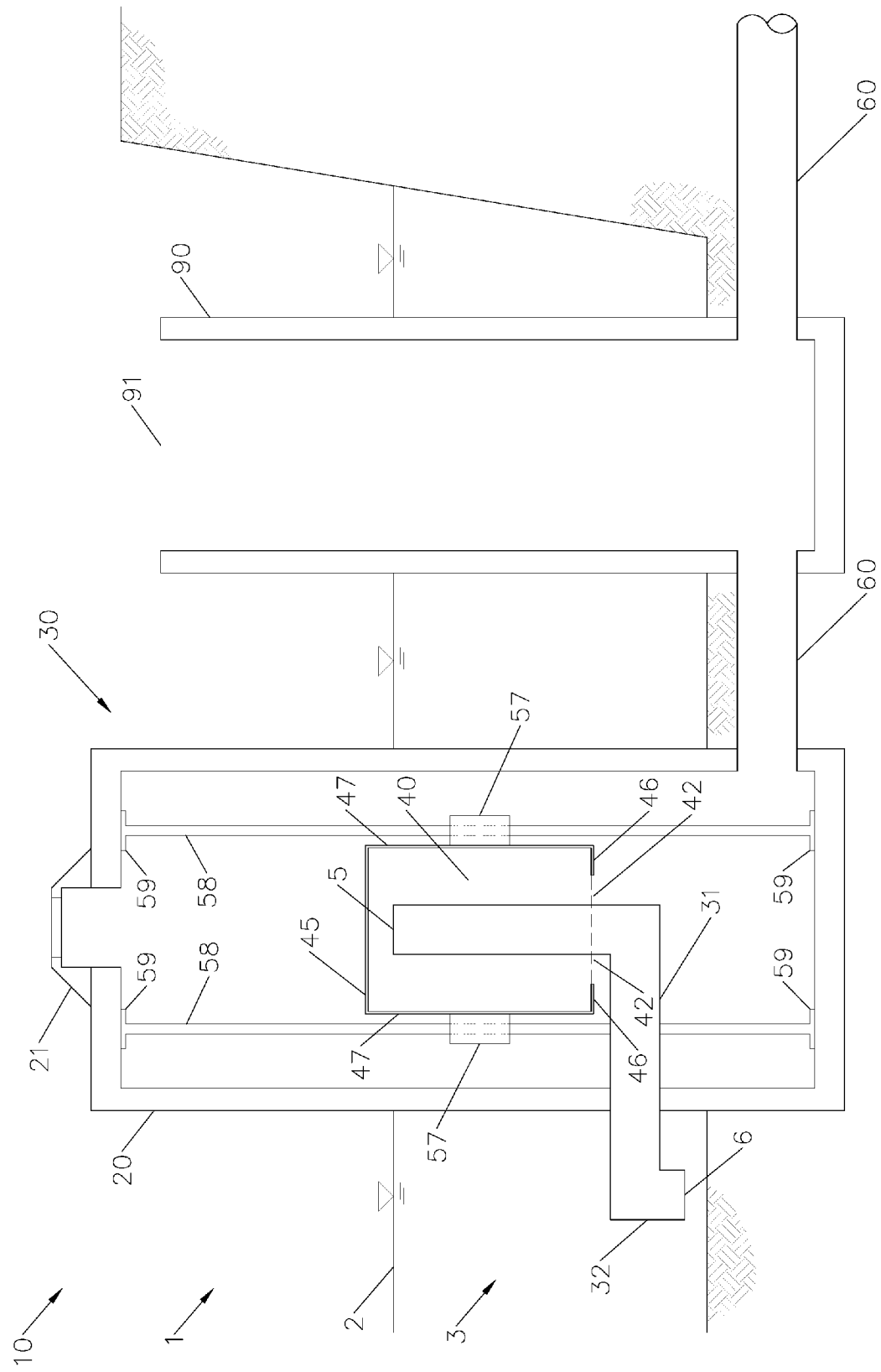
FIG. 2 illustrates a cross sectional view of a system of the present invention, wherein the fluid level in the upstream reservoir is at the minimum, controlled level.

Referring to FIG. 2, a cross-sectional view of the present invention will be described. The flow control system 30 is incorporated into a fluid handling system 10 wherein the flow control system 30 receives the flow of fluid 3 from an upstream reservoir 1 and discharges the flow to a downstream drainage system 60.

The flow control system 30 consists of four primary components; a closed conduit 31, a pressure vessel 40, a means to restrain the pressure vessel from significant lateral movement, and a container 20.

The closed conduit 31 is made of plastic, metal, concrete or any other material which is suitable for conveying the fluid 3, and is connected to the upstream reservoir 1, at its inlet 6, below the fluid surface 2. The closed conduit passes from the reservoir 1, through the walls of and into the interior of a container 20 which is fluidly interfaced to a downstream drainage system 60. The outlet 5 end of the closed conduit 31 has an axis which is vertical, such that its outlet 5 is directed upward into the interior of the pressure vessel 40, which also positioned within the interior of the container 20. The inlet 6 end of the closed conduit 31 is equipped with an optional baffle 32, to prevent entry of undesirable materials such as trash, debris, greases, oils and the like from entering or possibly interfering with the operation of the flow control system 30. Although the optional baffle 32 is depicted in the form of an elbow oriented such that its entrance is directed downward, there are many ways to protect the inlet 6 of the closed conduit 31 from the unwanted entry of undesirable materials. In some embodiments it is anticipated the inlet 6 may be protected by a screen, or by connection to a surface skimming device.

The pressure vessel 40 has a hollow interior enclosed by an upper surface 45, a lower surface 46 and a vertical surface 47. The lower surface 46 of the pressure vessel 40 has an opening 42 through which the pressure vessel 40 is slideably engaged over the exterior of the outlet 5 end of the closed conduit 31. There is no seal between interior of the pressure vessel 40 and the exterior of the closed conduit 31, such that the interior of the pressure vessel is fluidly connected to the interior of the container 20, through the interstitial space formed by the intersection of the exterior of the closed conduit 31, with opening 42 through the lower surface 46 of the pressure vessel 40. Two, guide bushings 57 are affixed to the exterior of the pressure vessel 40 and are slideably engaged over the exterior of two guide rods 58, the axes of which are vertical.

The guide rods 58 are fashioned from metal, plastic, composites or any other suitably rigid and robust material and are affixed to the interior of the container 20 such that their position within the interior of the container 20 is made stationary and their axes are maintained vertical. The guide bushings 57, which are slideably engaged over the exterior of the guide rods 58, provide a means to restrain the pressure vessel 40 from any significant lateral movement, while allowing the pressure vessel 40 to move vertically. Although the guide rods 58 are depicted as being affixed to the interior of the container 20 with a bracket 59, it is anticipated in some embodiments the position of the guide rods may be made stationary by any number of means including embedment into the walls of the container 20, or compression against the walls of the container 20.

The container 20 can be fashioned from materials such as concrete, metal, plastic or any other material or combination of materials which provide adequate structural integrity and are also reasonably impervious, and suitable for exposure to the fluid 3. In some embodiments, the upper end of the container 20 may be open, and in other embodiments it may be closed, so long as the interior of the container 20 can be maintained at the ambient, atmospheric pressure. An optional accessway 21 may be provided when the upper end of the container 20 is closed, such that the flow control system 30 is easily accessed for inspection or maintenance. The optional accessway 21 is depicted as a manhole rim and cover; however, in some embodiments, it is anticipated that the optional accessway 21 may be provided in the form of a catch basin grate, hatch cover or any number of other suitable means to provide access from the surface into the interior of the container 20.

An overflow riser 90, is located downstream of the container 20, and is fluidly interfaced to the downstream drainage system 60, at a point which is downstream from the container 20. The overflow riser is made of concrete, metal, plastic or any other material which has adequate structural integrity and is suitable for conveying discharges of fluid 3. When the fluid surface 2 in the reservoir 1 has risen to a level above the upper rim 91 of the overflow riser 90, the overflow riser 90 provides a means to accommodate an increased rate of discharge when the volumetric capacity of the reservoir 1 is in danger of being exceeded. Although both the container 20 and the overflow riser 90 are depicted as being positioned in the reservoir 1, it is not required. In some embodiments it is anticipated the container 20 may be located outside of the reservoir 1, and the overflow riser 90 may be connected to the downstream drainage system 60, at a point downstream from the container 20, by means of a pipe which is routed around the container 20. The position of the overflow riser 90 may be at any of a number of locations, so long as its upper rim 91 is fluidly connected to the reservoir 1, and it is connected to the downstream drainage system 60, at a point which is downstream from the container 20.

The pressure vessel 40 is depicted at an initial level, at which the fluid surface 2 in the reservoir 1, is at the same level as the lowest point on the downstream, outlet 5 end of the closed conduit 31, and is the minimum, controlled level, at which there is no flow, and no discharge of fluid 3 from the flow control system 30 into the downstream drainage system 60.

Figure 3:
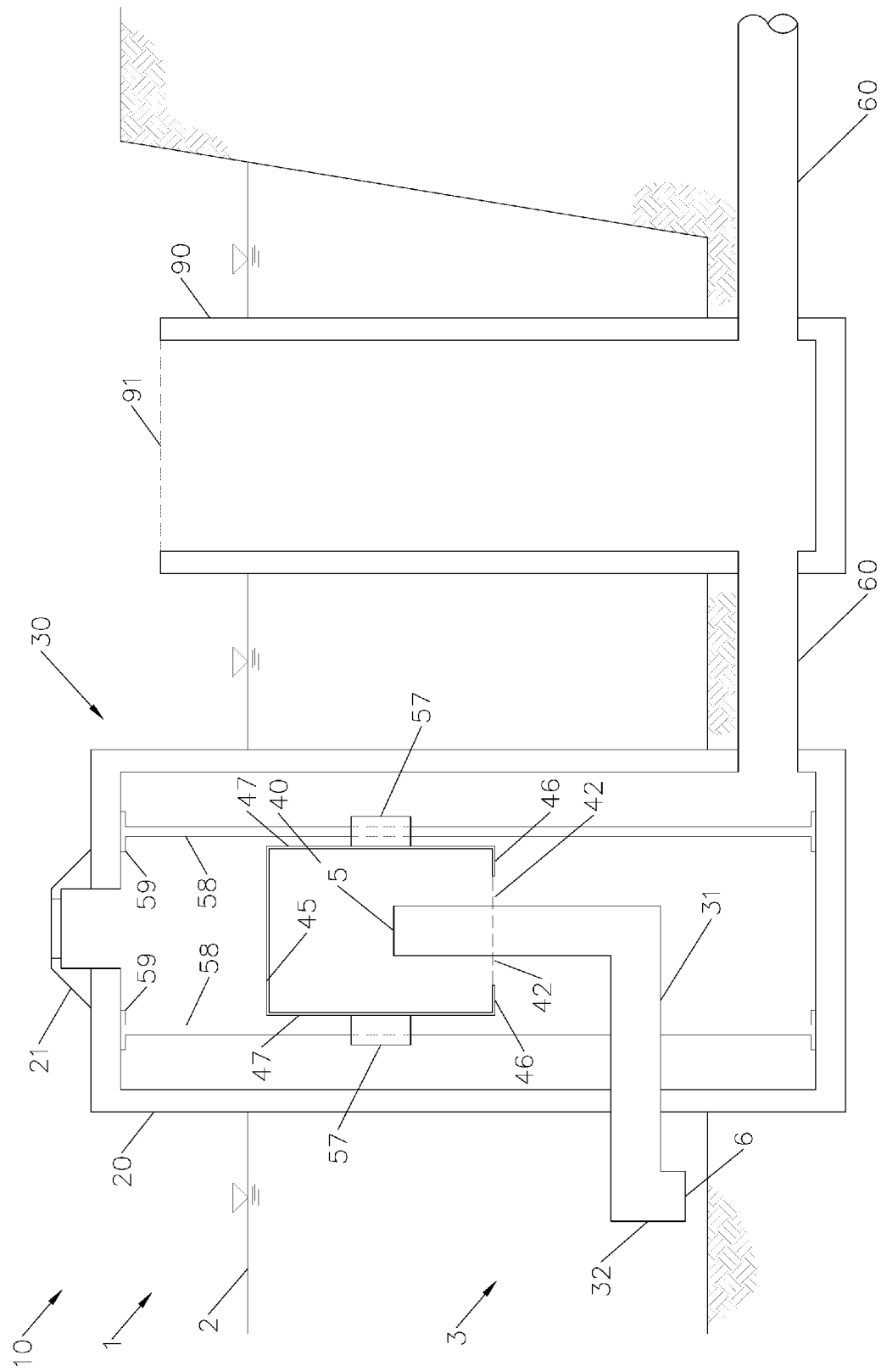
FIG. 3 illustrates a cross sectional view of a system of the present invention, wherein the fluid level in the upstream reservoir has risen above the minimum, controlled level.

Referring to FIG. 3, a cross sectional view of a system of the present invention will now be described. The flow control system 30 and fluid handling system 10 are the same flow control system 30 and fluid handling system 10 depicted in FIG. 2, wherein the flow control system 30 is incorporated into a fluid handling system 10, and wherein the flow control system 30 receives the flow of fluid 3 from an upstream reservoir 1, and discharges the flow to a downstream drainage system 60. The fluid surface 2 in the upstream reservoir 1 has risen above the initial, minimum, controlled level, and the fluid 3 is flowing through the flow control system 30, from the upstream reservoir 1, through the inlet 6 and the optional baffle 32, into the closed conduit 31, upward into the pressure vessel 40, and out through the interstitial space formed by the intersection of the exterior of the closed conduit 31, with the opening 42 through the lower surface 46 of the pressure vessel 40, into the interior of the container 20, and out into the downstream drainage system 60. The pressure vessel 40 has moved upward from its initial level in response to the increase in system pressure caused by the rise of the fluid surface 2 in the upstream reservoir 1 and, in turn, the level of the opening 42, through the lower surface 46 of the pressure vessel 40, has risen to a prescribed level, which is below the fluid surface 2 in the upstream reservoir 1, and the rate of flow through the flow control system 30 is maintained within a range of desirable release rates prescribed for the fluid handling system 10.

Figure 4:
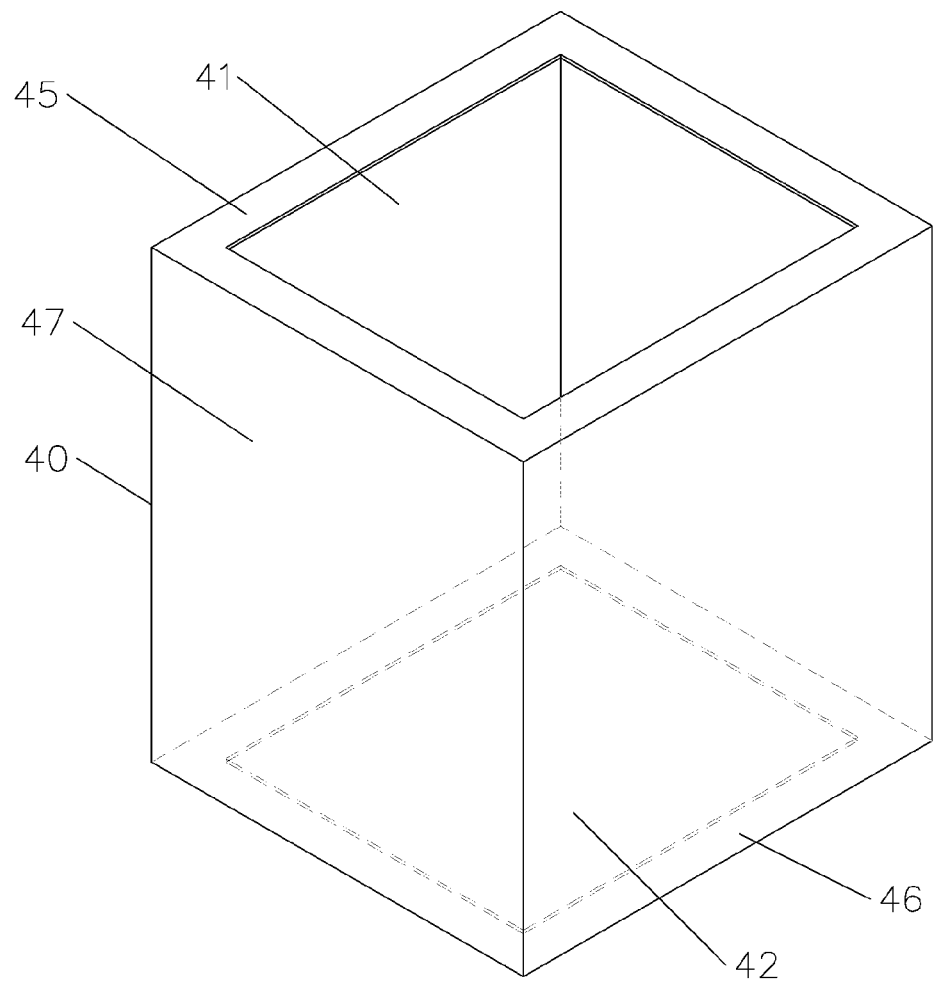
FIG. 4 illustrates a perspective view of the pressure vessel of an alternate embodiment of the present invention.

Referring to FIG. 4, a perspective view of the pressure vessel 40 of an alternate embodiment of the present invention will be described. The pressure vessel 40 has a hollow interior, enclosed by an upper surface 45, a lower surface 46 and a vertical surface 47. An opening 42 is provided through the lower surface 46 of the pressure vessel 40, and another opening 41 is provided through the upper surface 45. The pressure vessel 40 is made from metal, plastic, fiberglass or any other sufficiently rigid and impervious material suitable for containing a liquid. Although the pressure vessel 40 is depicted as having a cubic form, the pressure vessel 40 may be fashioned in any number of geometric forms such as cylindrical, spherical, hemispherical or polyhedral. Further, although the opening 41 through the upper surface 45, and the opening 42 through the lower surface 46, are depicted as having a square geometric form of similar dimension, it is not required. It is anticipated in some embodiments the geometric form and dimensions of the openings 41 and 42 may be dissimilar in both form and dimension. For example, the opening 41 through the upper surface 46 may be circular, while the opening 42 through the lower surface 46 may be rectangular.

Figure 4A:
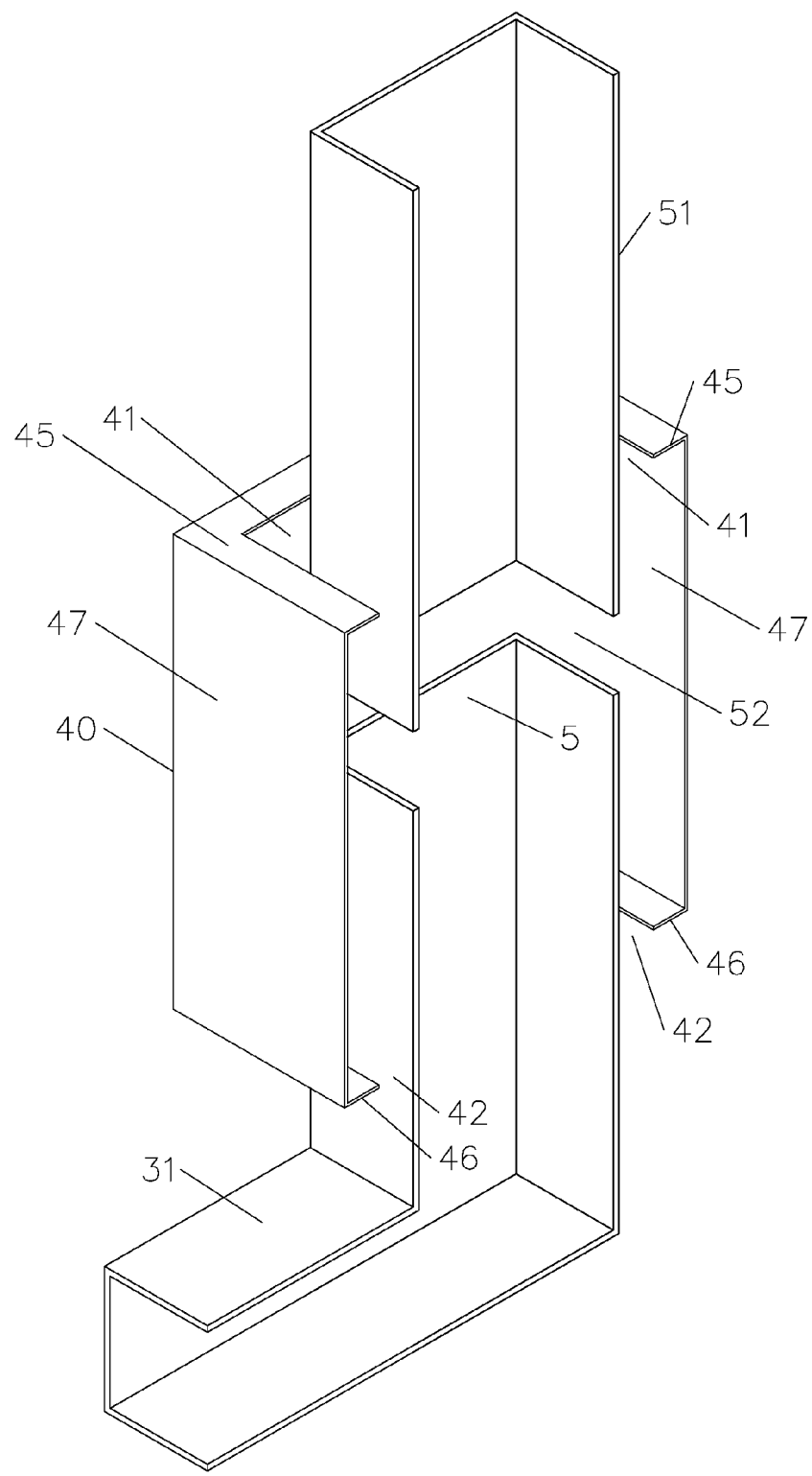
FIG. 4A illustrates a perspective, cross-sectional view of the pressure vessel, closed conduit and distal, lower end of a standpipe of an alternate embodiment of the present invention.

Referring to FIG. 4A, a perspective, cross-sectional view of the pressure vessel 40, the closed conduit 31, and the means to restrain the pressure vessel 40 from significant lateral movement, of a second embodiment of the present invention will be described. The closed conduit 31 has an axis which is vertical at its downstream, outlet 5 end. Although a portion of the closed conduit 31 is depicted as having an axis which is horizontal, the same portion of the closed conduit 31 may have an axis of any angle, whereas it is only necessary that the downstream, outlet 5 end of the closed conduit 31 have an axis which is vertical. The closed conduit 31 may be fashioned from any number of materials such as plastic, concrete or metal so long as the material has suitable properties for conveying liquids at the anticipated pressures. The distal, lower end of a standpipe 51 is positioned over the downstream, outlet 5 end of the closed conduit 31, and a space 52 is provided between the outlet 5 of the closed conduit 31 and the distal, lower end of the standpipe 51, such that standpipe 51 is not physically connected to the closed conduit 31, and such that liquid can pass from interior of the closed conduit 31 into the interior of the pressure vessel 40. The pressure vessel 40 is slideably engaged over both the exterior of the distal, lower end of the standpipe 51, and the downstream, outlet 5 end of the closed conduit 31, through the openings 41 and 42, provided through the upper surface 45, and lower surface 46, of the pressure vessel 40, respectively; and such that the downstream, outlet 5 end of the closed conduit 31, and the distal, lower end of the standpipe 51 are contained within the interior of the pressure vessel 40, enclosed by the upper surface 45, lower surface 46 and vertical surface 47. Whereas the pressure vessel 40 is slideably engaged over both the exterior of the standpipe 51, and the exterior of the closed conduit 31, the pressure vessel is restrained from significant lateral movement, yet is free to move vertically. There is no seal between the exterior of closed conduit 31 and the lower surface 46 of the pressure vessel 40, and there is no seal between the exterior of the standpipe 51 and upper surface 45 of the pressure vessel 40, (however, optionally one could be utilized), such that when there is liquid, at sufficient pressure within the interior of the pressure vessel 40, the liquid can flow out through the interstitial space, formed by the intersection of the exterior of the standpipe 51 and the exterior of the closed conduit 31, with the openings 41 and 42, through the upper surface 45 and lower surface 46 of the pressure vessel 40, respectively. Although the interstitial space formed by the intersection of the exterior surfaces of the standpipe 51 and the closed conduit 31, with the openings 41 and 42, through the upper surface 45 and lower surface 46 of the pressure vessel 40, is depicted as having a uniform and constant dimension; such a uniform and constant dimension is not required. It is anticipated, in some embodiments, the dimension may be prescriptively varied with the shape of the openings 41 and 42, provided through the upper surface 45 and lower surface 46 of the pressure vessel 40, the geometric cross section of the portion of the closed conduit 31, over which the pressure vessel 40 is slideably engaged, the geometric cross section of the portion of distal, lower end of the standpipe 51, over which the pressure vessel 40 is also slideably engaged, or any combination or permutation thereof.

Figure 5:
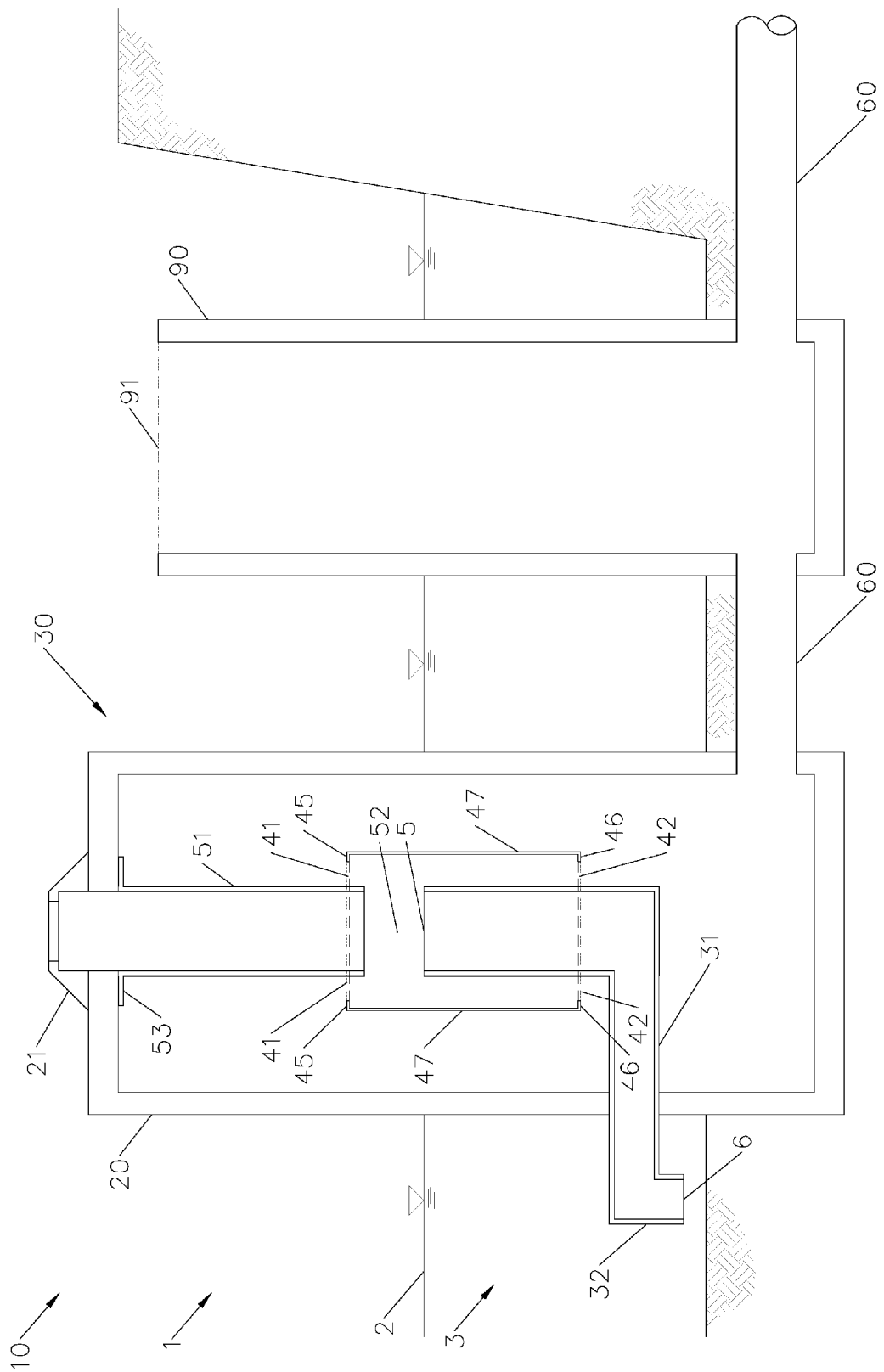
FIG. 5 illustrates a cross-sectional view of a system of an alternate embodiment of the present invention, wherein the fluid level in the upstream reservoir is at the minimum, controlled level.

Referring to FIG. 5, a cross-sectional view of a system of the alternate embodiment of the present invention will be described. The flow control system 30 is incorporated into a fluid handling system 10 wherein the flow control system 30 receives the flow of fluid 3 from an upstream reservoir 1 and discharges the flow to a downstream drainage system 60.

The flow control system 30 consists of four primary components; a closed conduit 31, a pressure vessel 40, a means to restrain the pressure vessel 40 from significant lateral movement, and a container 20.

The closed conduit 31 is made of plastic, metal, concrete or any other material which is suitable for conveying the fluid 3, and is connected to the upstream reservoir 1, at its inlet 6, below the fluid surface 2. The closed conduit passes from the reservoir 1, through the walls of, and into the interior of, a container 20, which is fluidly interfaced to a downstream drainage system 60. The outlet 5 end of the closed conduit 31 has an axis which is vertical, such that its outlet 5 is directed upward into the interior of the pressure vessel 40, which also positioned within the interior of the container 20. The inlet 6 end of the closed conduit 31 is equipped with an optional baffle 32, to prevent entry of undesirable materials such as trash, debris, greases, oils and the like from entering or possibly interfering with the operation of the flow control system 30. Although the optional baffle 32 is depicted in the form of an elbow oriented such that its entrance is directed downward, there are many ways to protect the inlet 6 of the closed conduit 31 from the unwanted entry of undesirable materials. In some embodiments it is anticipated the inlet 6 may be protected by a screen, or by connection to a surface skimming device.

The pressure vessel 40 has a hollow interior enclosed by an upper surface 45, a lower surface 46 and a vertical surface 47. The lower surface 46 of the pressure vessel 40 has an opening 42, through which the lower end of the pressure vessel 40 is slideably engaged, over the exterior of the outlet 5 end of the closed conduit 31. The upper surface 45 of the pressure vessel is also provided with an opening 41, through which the upper end of the pressure vessel 40 is slideably engaged, over the distal, lower end of a standpipe 51, affixed to the interior of the container 20. The pressure vessel 40 is thereby restrained from any significant lateral movement, yet is free to move vertically. The distal, lower end of the standpipe 51 is aligned over the outlet 5 of the closed conduit 31, and a space 52 is maintained between the outlet 5 and the distal, lower end of the standpipe 51, such that fluid 3 may pass through the outlet 5 of the closed conduit 31 into the interior of the pressure vessel 40. Although, a single standpipe 51, having the same interior and exterior dimensions as the closed conduit 31 is depicted, any number of standpipes 51, having any number of varying interior and exterior dimensions, may be provided. There is no seal between interior of the pressure vessel 40 and the exterior of the closed conduit 31, and there is no seal between the interior of the pressure vessel 40 and exterior of the standpipe 51 (however, optionally one could be utilized), such that the interior of the pressure vessel 40 is fluidly connected to the interior of the container 20, through the interstitial space formed by the intersection of the exterior of the standpipe 51, with the opening 41 through the upper surface 45 of the pressure vessel 40, and the intersection of the exterior of the closed conduit 31, with opening 42 through the lower surface 46 of the pressure vessel 40.

The standpipe 51 is fashioned from metal, plastic, composites or any other suitably rigid and robust material and is affixed to the interior of the container 20, such that its position within the interior of the container 20 is made stationary and its axis is maintained vertical. Although the standpipe 51 is depicted as being affixed to the interior of the container 20 with a flange 53, it is anticipated in some embodiments the position of the standpipe 51 may be made stationary by any number of means including embedment into the walls of the container 20. The interior of the standpipe 51 is maintained at the ambient, atmospheric pressure.

While not depicted, this arrangement could also be achieved by utilizing a single pipe with an appropriately sized opening(s) in the pipe which could effectively act in the same manner at the described arrangement of the closed conduit 31, standpipe 51, and space 52

The container 20 can be fashioned from materials such as concrete, metal, plastic or any other material or combination of materials which provide adequate structural integrity and are also reasonably impervious and suitable for exposure to the fluid 3. In some embodiments, the upper end of the container 20 may be open, and in other embodiments it may be closed, so long as the interior of the container 20 can be maintained at the ambient, atmospheric pressure. An optional accessway 21 may be provided when the upper end of the container 20 is closed, such that the flow control system 30 is easily accessed for inspection or maintenance. The optional accessway 21 is depicted as a manhole rim and cover; however, in some embodiments, it is anticipated that the optional accessway 21 may be provided in the form of a catch basin grate, hatch cover or any number of other suitable means to provide access into the interior of the container 20. For simplicity, the optional accessway 21 is depicted as being positioned over the upper end of the standpipe 51, which provides an ideal vantage point to make observations into the interior of the flow control system 30; however, such positioning is not required, and the optional accessway 21 may be positioned at any location where it provides convenient access into the interior of the container 20. In some embodiments, it is anticipated more than one optional accessway 21 will be provided.

An overflow riser 90 is located downstream of the container 20, and is fluidly interfaced to the downstream drainage system 60, at a point which is downstream from the container 20. The overflow riser 90 is made of concrete, metal, plastic or any other material which has adequate structural integrity and is suitable for conveying discharges of fluid 3. When the fluid surface 2 in the reservoir 1 has risen to a level above the upper rim 91 of the overflow riser 90, the overflow riser 90 provides a means to accommodate an increased rate of discharge when the volumetric capacity of the reservoir 1 is in danger of being exceeded. Although both the container 20 and the overflow riser 90 are depicted as being positioned in the reservoir 1, it is not required. In some embodiments it is anticipated that the container 20 may be located outside of the reservoir 1, and the overflow riser 90 may be connected to the downstream drainage system 60 at a point downstream from the container 20, by means of a pipe which is routed around the container 20. The position of the overflow riser 90 may be at any of a number of locations, so long as its upper rim 91 is fluidly connected to the reservoir 1, and it is connected to the downstream drainage system 60, at a point which is downstream from the container 20.

The pressure vessel 40 is depicted at an initial level, at which the fluid surface 2 in the reservoir 1 is at the same level as the lowest point on the downstream, outlet 5 end of the closed conduit 31, and is the minimum, controlled level, at which there is no flow and no discharge of fluid 3 from the flow control system 30 into the downstream drainage system 60.

Figure 6:
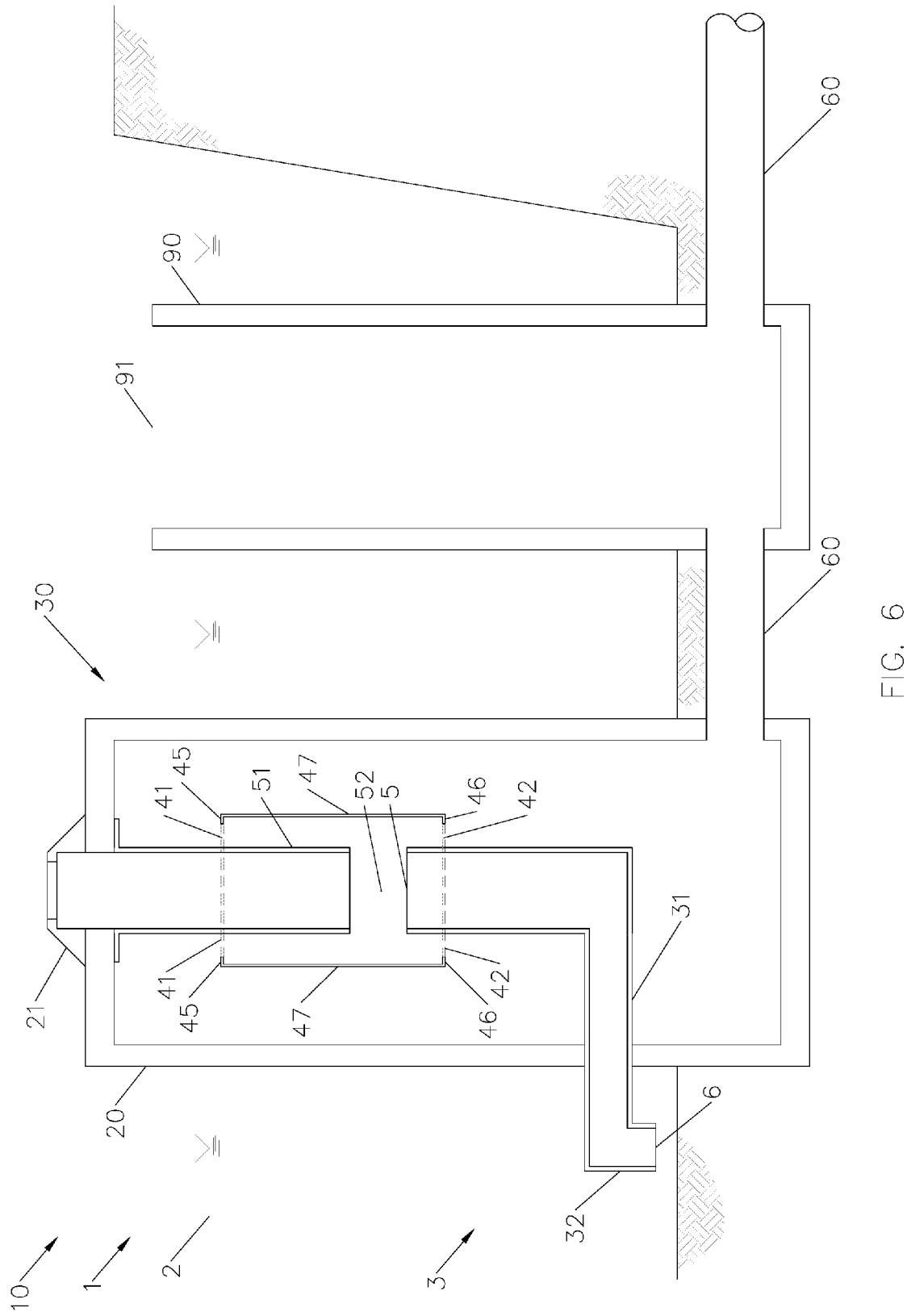
FIG. 6 illustrates a cross-sectional view of a system of an alternate embodiment of the present invention, wherein the fluid level in the upstream reservoir has risen above the minimum, controlled level.

Referring to FIG. 6, a cross sectional view of an alternate embodiment of the fluid handling system of the present invention will be described. The flow control system 30 and fluid handling system 10 are the same flow control system 30 and fluid handling system 10 depicted in FIG. 5, wherein the flow control system 30 is incorporated into a fluid handling system 10, and wherein the flow control system 30 receives the flow of fluid 3 from an upstream reservoir 1 and discharges the flow to a downstream drainage system 60. The fluid surface 2 in the upstream reservoir 1 has risen above the initial, minimum, controlled level, and the fluid 3 is flowing through the flow control system 30, from the upstream reservoir 1, through the inlet 6 and the optional baffle 32, into the closed conduit 31, upward into the pressure vessel 40, and out through the interstitial space, formed by the intersection of the exterior of the closed conduit 31 with the opening 42 through the lower surface 46 of the pressure vessel 40, and by the intersection of the exterior of the standpipe 51 with the opening 41 through the upper surface 45 of the pressure vessel 40, into the interior of the container 20 and out into the downstream drainage system 60. The pressure vessel 40 has moved upward from its initial level in response to the increase in system pressure caused by the rise of the fluid surface 2 in the upstream reservoir 1 and, in turn, the level of the openings 41 and 42, through the upper surface 45, and lower surface 46, respectively of the pressure vessel 40 has risen to a prescribed level which is below the fluid surface 2 in the upstream reservoir 1, and the rate of flow through the flow control system 30 is maintained within a range of desirable release rates prescribed for the fluid handling system 10.

Figure 7:
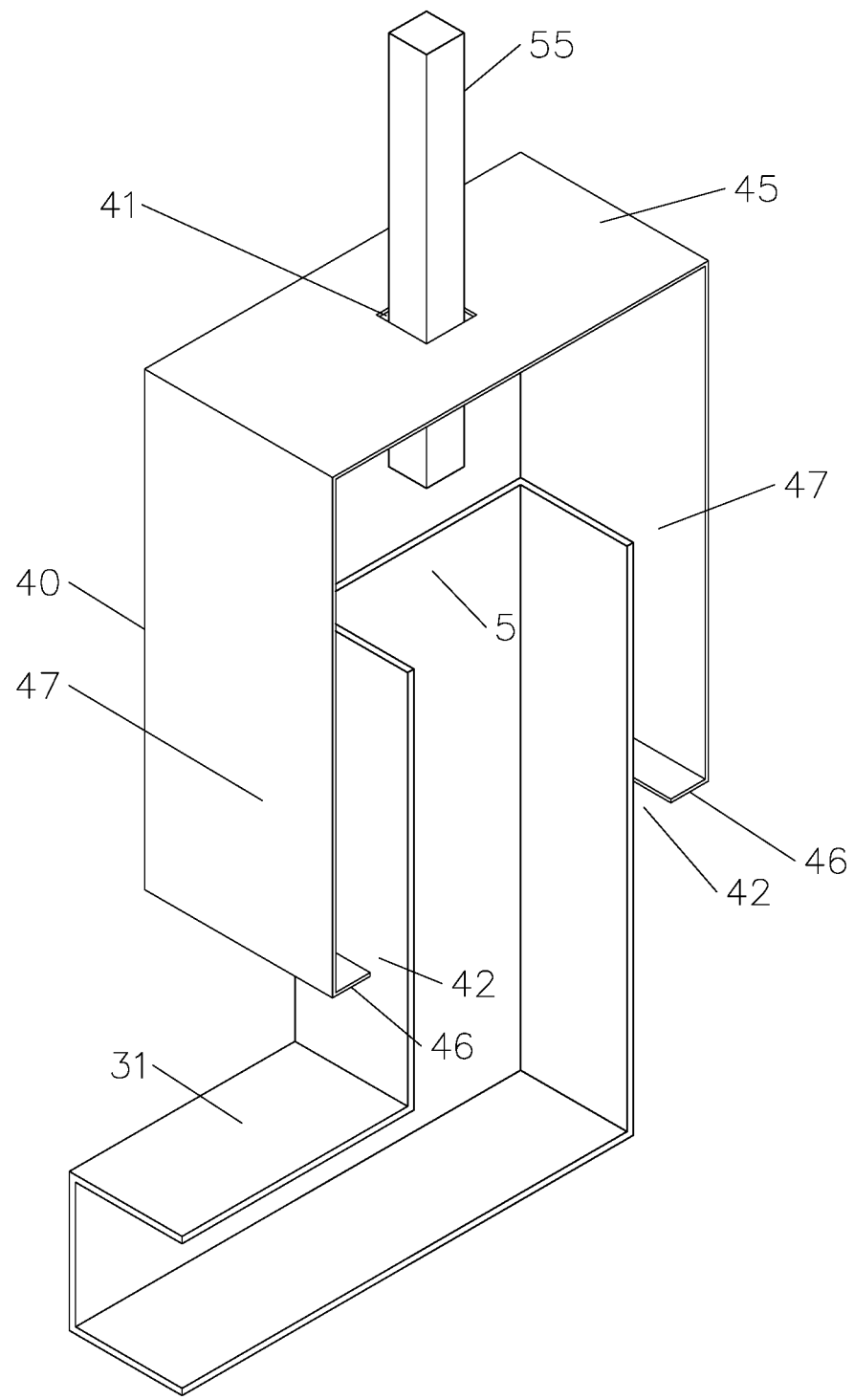
FIG. 7 illustrates a perspective, cross-sectional view of the pressure vessel, the closed conduit, and a means to restrain the pressure vessel from significant lateral movement, of a second alternate embodiment of the present invention.

Referring to FIG. 7, a perspective, cross-sectional view of the pressure vessel 40, the closed conduit 31, and a means to restrain the pressure vessel 40 from significant lateral movement, of a second alternate embodiment of the flow control system present invention will be described. The closed conduit 31 has an axis which is vertical at its downstream, outlet 5 end. Although a portion of the closed conduit 31 is depicted as having an axis which is horizontal, the same portion of the closed conduit 31 may have an axis of any angle, whereas it is only necessary that the downstream, outlet 5 end of the closed conduit 31 have an axis which is vertical. The closed conduit 31 may be fashioned from any number of materials such as plastic, concrete or metal so long as the material has suitable properties for conveying liquids at the anticipated pressures. The pressure vessel 40 is slideably engaged over both the exterior of a distal, lower end of a rigid rod 55, and the downstream, outlet 5 end of the closed conduit 31, through the openings 41 and 42, provided through the upper surface 45, and lower surface 46, of the pressure vessel 40, respectively; and such that the downstream and outlet 5 end of the closed conduit 31, and the distal, lower end of the rigid rod 55, is contained within the interior of the pressure vessel 40, enclosed by the upper surface 45, lower surface 46 and vertical surface 47. The pressure vessel 40 is made from metal, plastic, fiberglass or any other sufficiently rigid and impervious material suitable for containing a liquid. The rigid rod 55 can be fashioned from any number of materials such as metal, plastic, or composites so long as the material is sufficiently rigid and robust enough for the purpose intended. Whereas the pressure vessel 40 is slideably engaged, over both exterior of the rigid rod 55, and the exterior of the closed conduit 31, the pressure vessel is restrained from significant lateral movement, yet is free to move vertically. There is no seal between the exterior of closed conduit 31 and the lower surface 46 of the pressure vessel 40, and there is no seal between the exterior of the rigid rod 55 and upper surface 45 of the pressure vessel 40 (however, optionally one could be utilized), such that when there is liquid, at sufficient pressure, within the interior of the pressure vessel 40, the liquid can flow out through the interstitial space, formed by the intersection of the exterior of the rigid rod 55, and the exterior of the closed conduit 31, with the openings 41 and 42 through the upper surface 45, and lower surface 46, of the pressure vessel 40, respectively. Although the interstitial space, formed by the intersection of the exterior surfaces of the rigid rod 55 and the closed conduit 31, with the openings 41 and 42 through the upper surface 45 and lower surface 46 of the pressure vessel 40, is depicted as having a uniform and constant dimension; such a uniform and constant dimension is not required. It is anticipated, in some embodiments, the dimension may be prescriptively varied with the shape of the openings 41 and 42, provided through the upper surface 45 and lower surface 46 of the pressure vessel 40, the geometric cross section of the portion of the closed conduit 31, over which the pressure vessel 40 is slideably engaged, the geometric cross section of the portion of distal, lower end of the rigid rod 55, over which the pressure vessel 40 is also slideably engaged, or any combination or permutation thereof.

Figure 7A:
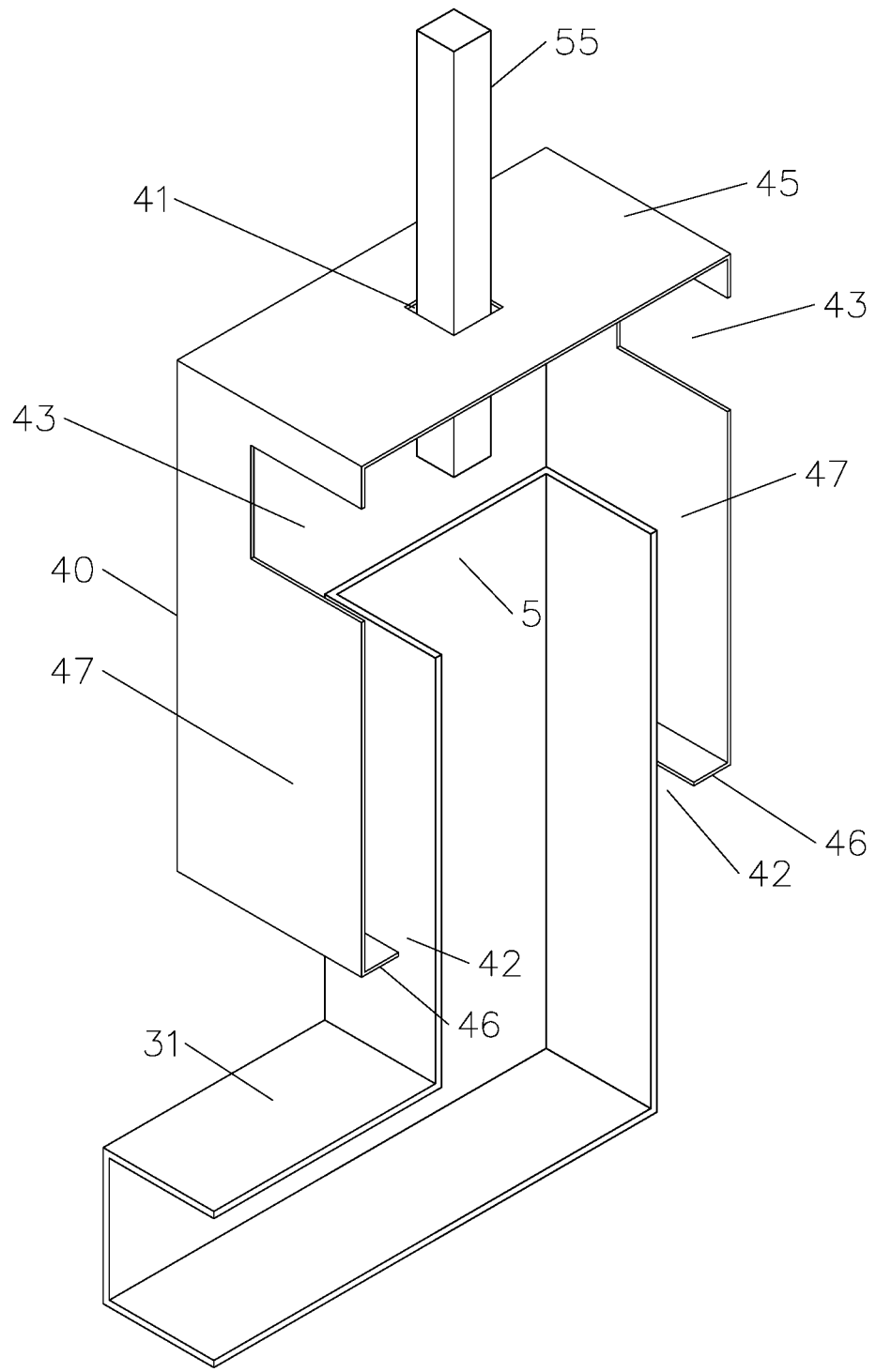
FIG. 7A illustrates a perspective, cross-sectional view of an alternate pressure vessel, the closed conduit, and a means to restrain the pressure vessel from significant lateral movement, of a second alternate embodiment of the present invention.

Referring to FIG. 7A a perspective, cross-sectional view of an alternate embodiment of the pressure vessel 40, the closed conduit 31, and a means to restrain the pressure vessel 40 from significant lateral movement, of the second alternate embodiment of the flow control system of the present invention will be described. The closed conduit 31 has an axis which is vertical at its downstream, outlet 5 end. Although a portion of the closed conduit 31 is depicted as having an axis which is horizontal, the same portion of the closed conduit 31 may have an axis of any angle, whereas it is only necessary that the downstream, outlet 5 end of the closed conduit 31 have an axis which is vertical. The closed conduit 31 may be fashioned from any number of materials such as plastic, concrete or metal so long as the material has suitable properties for conveying liquids at the anticipated pressures. The pressure vessel 40 is slideably engaged, over both the exterior of a distal, lower end of a rigid rod 55, and the downstream and outlet 5 end of the closed conduit 31, through the openings 41 and 42, provided through the upper surface 45, and lower surface 46, of the pressure vessel 40, respectively; and such that the downstream and outlet 5 end of the closed conduit 31, and the distal, lower end of the rigid rod 55 are contained within the interior of the pressure vessel 40, enclosed by the upper surface 45, lower surface 46 and vertical surface 47. The pressure vessel 40 is made from metal, plastic, fiberglass or any other sufficiently rigid and impervious material suitable for containing a liquid. The rigid rod 55 can be fashioned from any number of materials such as metal, plastic, or composites so long as the material is sufficiently rigid and robust enough for the purpose intended. Whereas the pressure vessel 40 is slideably engaged, over both the exterior of the rigid rod 55, and the exterior of the closed conduit 31, the pressure vessel is restrained from significant lateral movement, yet is free to move vertically. There is no seal between the exterior of closed conduit 31 and the lower surface 46 of the pressure vessel 40, and there is no seal between the exterior of the rigid rod 55 and upper surface 45 of the pressure vessel 40 (however, optionally one could be utilized), such that when there is liquid, at sufficient pressure, within the interior of the pressure vessel 40, the liquid can flow out through the interstitial space, formed by the intersection of the exterior of the rigid rod 55, and the exterior of the closed conduit 31, with the openings 41 and 42 through the upper surface 45, and lower surface 46, of the pressure vessel 40, respectively. Although the interstitial space, formed by the intersection of the exterior surfaces of the rigid rod 55 and the closed conduit 31, with the openings 41 and 42 through the upper surface 45 and lower surface 46 of the pressure vessel 40, is depicted as having a uniform and constant dimension; such a uniform and constant dimension is not required. It is anticipated, in some embodiments, the dimension may be prescriptively varied with the shape of the openings 41 and 42, provided through the upper surface 45 and lower surface 46 of the pressure vessel 40, the geometric cross section of the portion of the closed conduit 31, over which the pressure vessel 40 is slideably engaged, the geometric cross section of the portion of the distal, lower end of the rigid rod 55, over which the pressure vessel 40 is also slideably engaged, or any combination or permutation thereof. Whereas if a specific flow control application requires a certain, minimum dimension of clear and open area to accommodate the passage of debris or suspended solid material, additional, non-interstitial and clear openings 43 are provided through the vertical surface 47 of the pressure vessel 40.

Figure 7B:
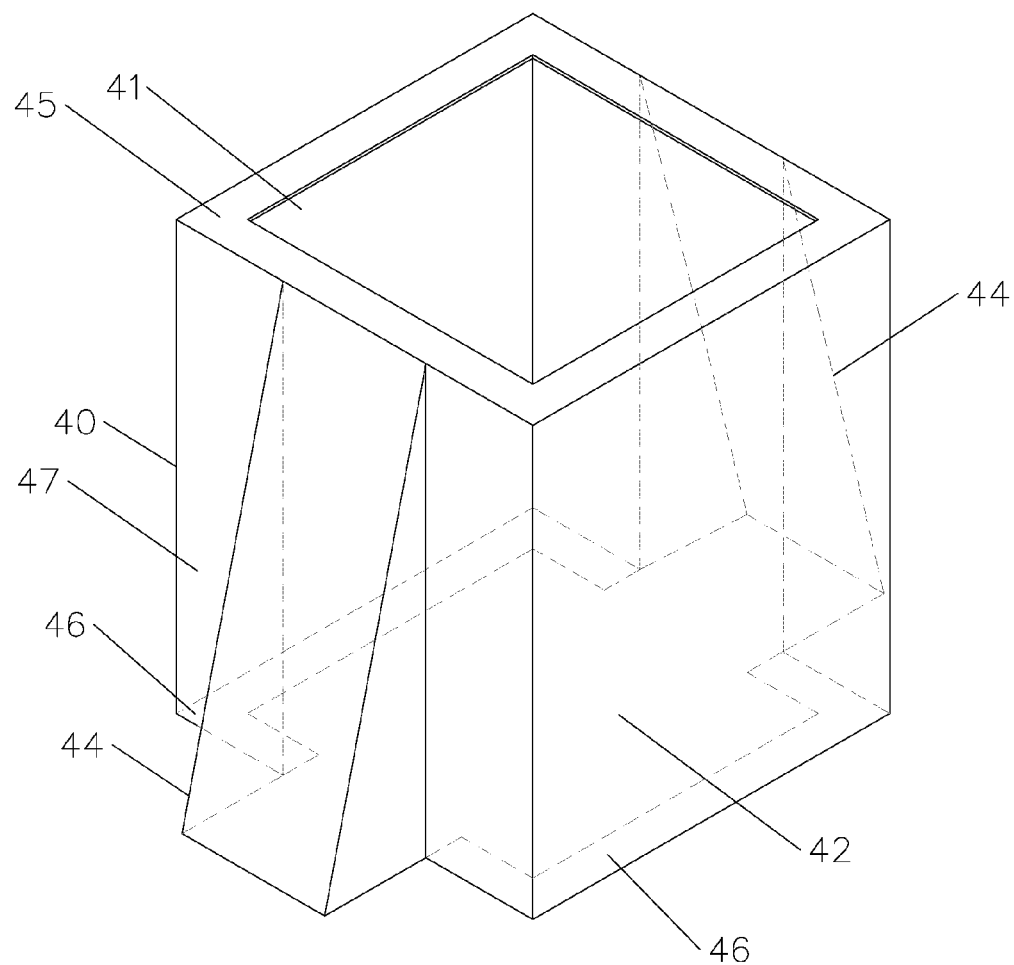
FIG. 7B illustrates a perspective view of a pressure vessel of a second alternate embodiment of the present invention.

Referring to FIG. 7B a perspective view of a second alternate embodiment of a pressure vessel 40 of the second alternate embodiment of the flow control system of the present invention will be described. The pressure vessel 40 has a hollow interior enclosed by an upper surface 45, a lower surface 46, and a vertical surface 47. An opening 42 is provided through the lower surface 46 of the pressure vessel 40, and another opening 41 is provided through the upper surface 45. The pressure vessel 40 is made from metal, plastic, fiberglass or any other sufficiently rigid and impervious material suitable for containing a liquid. Although the pressure vessel 40 is depicted as having a generally cubic form, the pressure vessel 40 may be fashioned in any number of geometric forms such as cylindrical, spherical, hemispherical or polyhedral. Further, although the opening 41 through the upper surface 45, and the opening 42 through the lower surface 46, are depicted as having a square geometric form of similar dimension, it is not required. It is anticipated in some embodiments the geometric form and dimensions of the openings 41 and 42 may be dissimilar in both form and dimension. For example, the opening 41 through the upper surface 46 may be circular, while the opening 42 through the lower surface 46 may be rectangular. A channel 44 which protrudes from the interior of the pressure vessel, is made integral to, and spans at least a portion of the length of the vertical surface 47 of the pressure vessel 40. The upper end of the channel is closed, such that it is made contiguous to the interior of the pressure vessel 40. The lower end of the channel 44 intersects the lower surface 46 of the pressure vessel 40, and opens from the interior of the pressure vessel 40 to the exterior of the pressure vessel 40, contiguous to the opening 42, through the lower surface 46 of the pressure vessel 40. Whereas it is anticipated certain flow control applications require a certain, minimum dimension of clear and open area to accommodate the passage of debris or suspended, solid material, the opening 42, through the lower surface 46 of the pressure vessel 40 is made larger at the location where the lower, and open end of the channels 44, which protrude from the vertical surface 47 of the pressure vessel 40, intersect the opening 42 through the lower surface 46 of the pressure vessel 40. Although, two channels 44, which protrude from the vertical surface 47 of the pressure vessel 40 are depicted, any number of channels 44, may be provided. Further, although the channels 44 are depicted as having a rectangular cross section and triangular profile, it is anticipated the channels 44 may be provided in any number of geometric cross sections and profiles so long as they provide for an enlarged opening 42 through the lower surface 46 of the pressure vessel 40.

Figure 8:
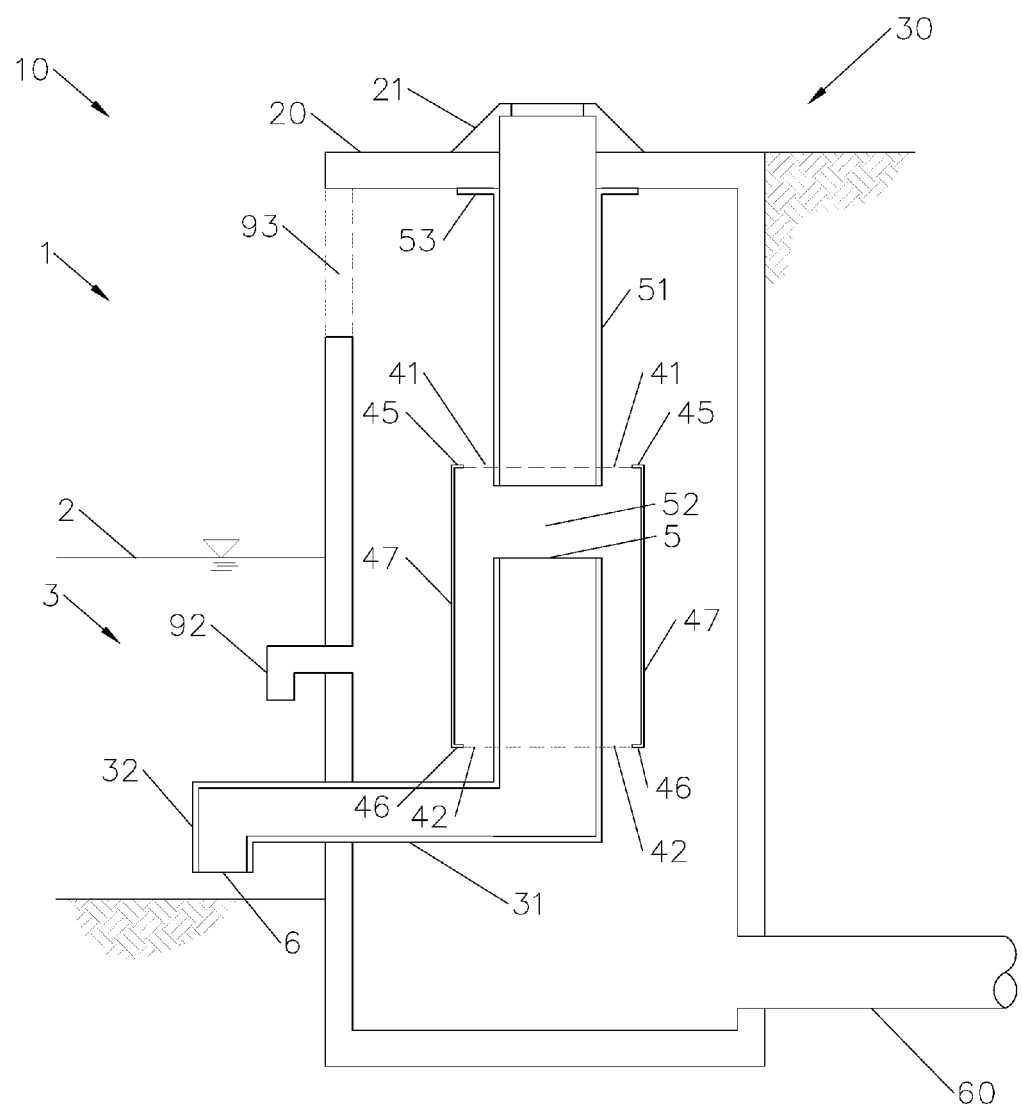
FIG. 8 illustrates a cross-sectional view of a third alternate embodiment of the present invention.

Referring to FIG. 8, a cross-sectional view of a third alternate embodiment of the fluid handling system 10 of the present invention will be described. The flow control system 30 is incorporated into the bank of a reservoir 1 and is fluidly interfaced to the reservoir 1. The closed conduit 31 is made of plastic, metal, concrete or any other material which is suitable for conveying the fluid 3, and is connected to the upstream reservoir 1, at its inlet 6, below the fluid surface 2. The closed conduit passes from the reservoir 1, through the walls of, and into the interior of, a container 20, which is fluidly interfaced to a downstream drainage system 60. The downstream, outlet 5 end of the closed conduit 31 has an axis which is vertical, such that its outlet 5 is directed upward into the interior of the pressure vessel 40, which also positioned within the interior of the container 20. The inlet 6 end of the closed conduit 31 is equipped with an optional baffle 32, to prevent entry of undesirable materials such as trash, debris, greases, oils and the like from entering or possibly interfering with the operation of the flow control system 30. Although the optional baffle 32 is depicted in the form of an elbow oriented such that its entrance is directed downward, there are many ways to protect the inlet 6 of the closed conduit 31 from the unwanted entry of undesirable materials. In some embodiments it is anticipated the inlet 6 may be protected by a screen, or by connection to a surface skimming device.

The pressure vessel 40 has a hollow interior, enclosed by an upper surface 45, a lower surface 46, and a vertical surface 47. The lower surface 46 of the pressure vessel 40 has an opening 42, through which the lower end of the pressure vessel 40 is slideably engaged, over the exterior of the downstream, outlet 5 end of the closed conduit 31. The upper surface 45 of the pressure vessel is also provided with an opening 41, through which the upper end of the pressure vessel 40 is slideably engaged over the distal, lower end of a standpipe 51, affixed to the interior of the container 20. The pressure vessel 40 is thereby restrained from any significant lateral movement, yet is free to move vertically. The distal, lower end of the standpipe 51 is aligned over the outlet 5 of the closed conduit 31 and a space 52 is maintained between the outlet 5 and the distal, lower end of the standpipe 51, such that fluid 3 may pass through the outlet 5 of the closed conduit 31 into the interior of the pressure vessel 40. Although, a single standpipe 51, having the same interior and exterior dimensions as the closed conduit 31 is depicted, any number of standpipes 51, having any number of varying interior and exterior dimensions, may be provided. There is no seal between interior of the pressure vessel 40 and the exterior of the closed conduit 31, and there is no seal between the interior of the pressure vessel 40 and exterior of the standpipe 51 (however, optionally one could be utilized), such that the interior of the pressure vessel 40 is fluidly connected to the interior of the container 20, through the interstitial space, formed by the intersection of the exterior of the standpipe 51 with the opening 41 through the upper surface 45 of the pressure vessel 40, and the intersection of the exterior of the closed conduit 31 with the opening 42 through the lower surface 46 of the pressure vessel 40.

The standpipe 51 is fashioned from metal, plastic, composites or any other suitably rigid and robust material and is affixed to the interior of the container 20, such that its position within the interior of the container 20 is made stationary and its axis is maintained vertical. Although the standpipe 51 is depicted as being affixed to the interior of the container 20 with a flange 53, it is anticipated in some embodiments the position of the standpipe 51 may be made stationary by any number of means including embedment into the walls of the container 20. The interior of the standpipe 51 is maintained at the ambient, atmospheric pressure.

The container 20 can be fashioned from materials such as concrete, metal, plastic or any other material or combination of materials which provide adequate structural integrity and are also reasonably impervious and suitable for exposure to the fluid 3. In some embodiments, the upper end of the container 20 may be open, and in other embodiments it may be closed, so long as the interior of the container 20 can be maintained at the ambient, atmospheric pressure. The flow control system 30 is positioned beneath an optional accessway 21, through the top of the container 20, such that the flow control system is easily accessed from the bank of the reservoir 1 for inspection or maintenance. The accessway 21 is depicted as a manhole rim and cover; however, in some embodiments, it is anticipated that the accessway 21 may be provided in the form of a catch basin grate, hatch cover or any number of other suitable means to provide access into the interior of the container 20 from above. For simplicity, the optional accessway 21 is depicted as being positioned over the upper end of the standpipe 51, which provides an ideal vantage point to make observations into the interior of the flow control system 30; however, such positioning is not required, and the optional accessway 21 may be positioned at any location where it provides convenient access into the interior of the container 20. In some embodiments, it is anticipated more than one optional accessway 21 will be provided.

An overflow weir 93 is provided, at a prescribed level, through the wall of the container 20 that is in communication with the fluid 3 in the reservoir 1. The overflow weir 93 provides a means to accommodate an increased rate of discharge when the volumetric capacity of the reservoir 1 is at risk of being exceeded. The overflow weir 93 may be provided in any number of geometric configurations and any number of prescribed levels. Further, it is also anticipated there may be more than one overflow weir 93 provided through the walls of the container 20 which are in communication with the fluid 3 in the reservoir 1. Although it is most convenient to utilize the container 20 as the means to provide an increased rate of discharge when the volumetric capacity of the reservoir 1 is at risk of being exceeded, it is not required. In some embodiments it is anticipated that a separate means to provide overflow control will be provided.

The pressure vessel 40 is depicted at an initial level, at which the fluid surface 2 in the reservoir 1 is at the same level as the lowest point on the outlet 5 end of the closed conduit 31, and is the minimum, controlled level, at which there is no flow and no discharge of fluid 3 from the flow control system 30 into the downstream drainage system 60; however, the container 20 has also been fitted with an additional, optional, inlet 92, which opens from the reservoir 1 to the interior of the container 20. The optional inlet 92 is depicted below the fluid surface 2 in the reservoir 1, and fluid 3 is flowing through the optional inlet 92 into the interior of the container 20 and out into the downstream drainage system 60. When the optional inlet 92 operates at levels below the initial, minimum, controlled level, it provides a means to drain the level of the reservoir 1 below the initial, minimum, controlled level. Although, only one optional inlet 92 is depicted, it is anticipated there may be a plurality of optional inlets 92 depending upon the requirements of the specific application. Further, it is anticipated that any number of optional inlets 92 may be provided above the initial, minimum, controlled level, depending on the requirements of the specific application, to provide a means to gradually increase the rate of discharge through the flow control system 30 as the fluid surface 2 in the reservoir 1 rises.

Although the flow control system 30 is depicted as being positioned in the bank of the reservoir 1, it is not required. In some embodiments it is anticipated that the container 20 may be located some distance downstream from the reservoir 1 and is housed in a separate chamber, such as a manhole, which is fluidly connected to the reservoir 1 and the downstream drainage system 60.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A flow control system for integration into detention ponds, surge tanks, reservoirs and other applications wherein upstream fluid levels vary in response to varying rates of inflow, the flow control system comprising:
    a container, the container having an interior with interior walls maintained at an ambient, atmospheric pressure, being fluidly connected to a downstream drainage system;
    a closed conduit having an outside dimension, an upstream and inlet end opening into a reservoir, and a downstream and outlet end within said container interior, an axis of which is vertical, opening upward;
    a pressure vessel having an exterior and an interior, enclosed by an upper surface, lower surface and a vertical surface which joins the lower surface to the upper surface, the pressure vessel lower surface having at least one opening larger than the outside dimension of the closed conduit, through which the pressure vessel is slideably engaged over the downstream and outlet end of said closed conduit;
    a means to restrain said pressure vessel from significant lateral movement, yet which allows the pressure vessel to move vertically, said means being affixed and made stationary within the interior of the container;
    whereas fluid flows from the upstream reservoir, through the closed conduit, upward into the pressure vessel, out through the at least one opening through the pressure vessel lower surface, into the container interior and out into the downstream drainage system.

2. The flow control system of claim 1, wherein at least one additional opening is provided through the pressure vessel surface, whereby if the at least one additional opening is located on the pressure vessel upper surface, the at least one additional opening must have an area smaller than the pressure vessel upper surface.

3. The flow control system of claim 1, wherein the means to restrain the pressure vessel from significant lateral movement is at least one bushing, said bushing being affixed to the exterior of the pressure vessel, said bushing being slideably engaged over a guide rod, an axis of which is vertical, the guide rod being affixed and made stationary within the container interior.

4. The flow control system of claim 3, wherein said guide rod is affixed to, and made stationary within the container interior, with a bracket.

5. The flow control system of claim 3, wherein the said guide rod is affixed to, and made stationary within the container interior by embedment of at least one end of the said guide rod into the interior walls of the container.

6. The flow control system of claim 3, wherein said guide rod is affixed to, and made stationary within the container interior, by compression of the guide rod against the interior walls of the container.

7. The flow control system of claim 1, wherein the means to restrain the pressure vessel from significant lateral movement, is at least one standpipe affixed and made stationary within the container interior, having a distal, lower end over which the pressure vessel is slideably engaged, through an opening provided through the pressure vessel upper surface.

8. The flow control system of claim 7, wherein said standpipe is affixed and made stationary within the container interior, with a flange.

9. The flow control system of claim 7, wherein said standpipe is affixed and made stationary within the container interior by embedment into the interior walls of the container.

10. The flow control system of claim 1, wherein the means to restrain the pressure vessel from significant lateral movement, is at least one rigid rod affixed and made stationary within the container interior, having a distal, lower end over which the pressure vessel is slideably engaged, through an opening provided through the pressure vessel upper surface.

11. The flow control system of claim 10, wherein said rigid rod is affixed and made stationary within the container interior with a bracket.

12. The flow control system of claim 10, wherein said rigid rod is affixed and made stationary within the container interior with a flange.

13. The flow control system of claim 10, wherein said rigid rod is affixed and made stationary within the container interior by embedment into the interior walls of the container.

14. A flow control system for integration into a reservoir, the flow control system comprising:
a container, the container having an interior with interior walls being in communication with a fluid in the reservoir, having an overflow weir, positioned at a prescribed level through the wall of the container, the container having an interior being maintained at an ambient, atmospheric pressure, being fluidly connected to a downstream drainage system;
a closed conduit having an outside dimension, an upstream and inlet end opening into the reservoir and having a downstream and outlet end within said container interior, an axis of which is vertical, opening upward;
a pressure vessel, an axis of which is vertical, having an interior, enclosed by an upper surface, lower surface and a vertical surface which joins the lower surface to the upper surface, the pressure vessel lower surface having at least one opening larger than the outside dimension of the closed conduit, through which the pressure vessel is slideably engaged over the downstream and outlet end of the closed conduit;
a means to restrain the pressure vessel from significant lateral movement, yet which allows the pressure vessel to move vertically, said means being affixed and made stationary within the interior of the container;
whereas fluid flows from the reservoir through the closed conduit, upward into the pressure vessel, out through the at least one opening through the pressure vessel lower surface, into the container interior and out into the downstream drainage system;
whereas when the fluid in the reservoir rises above a prescribed level of the overflow weir, the fluid also flows over the overflow weir into the interior of the container and out into the downstream drainage system.

15. The flow control system of claim 14, wherein at least one additional opening is provided through the pressure vessel surface, whereby if the at least one additional opening is located on the pressure vessel upper surface, the at least one additional opening must have an area smaller than the pressure vessel upper surface.

16. The flow control system of claim 14, wherein the means to restrain the pressure vessel from significant lateral movement is at least one bushing, said bushing being affixed to the exterior of the pressure vessel, said bushing being slideably engaged over a guide rod, an axis of which is vertical, said guide rod being affixed and made stationary within the container interior.

17. The flow control system of claim 16, wherein the said guide rod is affixed to, and made stationary within the container interior, with a bracket.

18. The flow control system of claim 16, wherein the said guide rod is affixed to, and made stationary within the container interior by embedment of at least one end of said guide rod into the interior walls of the container.

19. The flow control system of claim 16, wherein said guide rod is affixed to, and made stationary within the container interior, by compression of the guide rod against the interior walls of the container.

20. The flow control system of claim 14, wherein said means to restrain the pressure vessel is at least one standpipe affixed and made stationary within the container interior, having a distal, lower end, over which the pressure vessel is slideably engaged, through an opening provided through the pressure vessel upper surface.

21. The flow control system of claim 20, wherein said standpipe is affixed and made stationary within the container interior, with a flange.

22. The flow control system of claim 20, wherein said standpipe is affixed and made stationary within the container interior by embedment into the interior walls of the container.

23. The flow control system of claim 14, wherein said means to restrain the pressure vessel is at least one rigid rod affixed and made stationary within the container interior having a distal, lower end, over which the pressure vessel is slideably engaged, through an opening provided through the pressure vessel upper surface.

24. The flow control system of claim 23, wherein said rigid rod is affixed and made stationary within the container interior with a bracket.

25. The flow control system of claim 23, wherein said rigid rod is affixed and made stationary within the container interior with a flange.

26. The flow control system of claim 23, wherein said rigid rod is affixed and made stationary within the container interior by embedment into the interior walls of the container.

* * * * *